United States Patent
Sato et al.

(10) Patent No.: US 7,594,613 B2
(45) Date of Patent: Sep. 29, 2009

(54) 2-DIMENSIONAL CODE FORMATION METHOD AND FORMATION DEVICE

(75) Inventors: Kazuo Sato, Aizuwakamatu (JP); Mitsuyoshi Kato, Kitaaizu-mura (JP)

(73) Assignee: Arai Corporation (JP)

( * ) Notice: Subject to any disclaimer, the term of this patent is extended or adjusted under 35 U.S.C. 154(b) by 164 days.

(21) Appl. No.: 10/565,775

(22) PCT Filed: Aug. 11, 2004

(86) PCT No.: PCT/JP2004/011799

§ 371 (c)(1),
(2), (4) Date: Jun. 20, 2006

(87) PCT Pub. No.: WO2005/015478

PCT Pub. Date: Feb. 17, 2005

(65) Prior Publication Data

US 2007/0038464 A1   Feb. 15, 2007

(30) Foreign Application Priority Data

Aug. 11, 2003 (JP) ............................. 2003-291400
Aug. 12, 2003 (JP) ............................. 2003-292391

(51) Int. Cl.
*G06K 19/06* (2006.01)
*G06K 9/36* (2006.01)
*G06K 9/80* (2006.01)
*G06K 9/18* (2006.01)

(52) U.S. Cl. ............. 235/494; 235/462.08; 235/462.09; 235/462.1; 235/456

(58) Field of Classification Search .................. 235/462.01–462.12
See application file for complete search history.

(56) References Cited

U.S. PATENT DOCUMENTS

| 6,000,614 | A | * | 12/1999 | Yang et al. | 235/460 |
| 6,121,574 | A |   | 9/2000 | Xu | |
| 6,164,552 | A |   | 12/2000 | Sato | |
| 6,429,951 | B1 | * | 8/2002 | Kiuchi et al. | 358/1.9 |
| 6,533,181 | B1 | * | 3/2003 | Roxby et al. | 235/494 |
| 6,681,055 | B1 | * | 1/2004 | Sato | 382/275 |
| 2002/0036643 | A1 | * | 3/2002 | Namizuka et al. | 345/555 |
| 2003/0105610 | A1 | * | 6/2003 | Souda | 702/150 |
| 2003/0224256 | A1 | * | 12/2003 | Endo et al. | 430/9 |
| 2004/0046024 | A1 | * | 3/2004 | Natsukari et al. | 235/454 |
| 2004/0094729 | A1 | * | 5/2004 | Struye et al. | 250/581 |
| 2006/0098227 | A1 | * | 5/2006 | Namizuka et al. | 358/1.16 |

FOREIGN PATENT DOCUMENTS

| JP | 62-212176 | 9/1987 |
| JP | 4-284272 | 10/1992 |
| JP | 11-167602 | 6/1999 |
| JP | 2003-140726 | 5/2003 |

\* cited by examiner

*Primary Examiner*—Thien M. Le
*Assistant Examiner*—Tuyen K Vo
(74) *Attorney, Agent, or Firm*—Bacon & Thomas, PLLC

(57) ABSTRACT

The 2-dimensional code formation method of this invention comprises: a process of specifying the code size for 2-dimensional code; a process of specifying storage information to be written in the 2-dimensional code; a process of setting the cell size for the unit cell of the 2-dimensional code; a process of specifying the dot step size or the number of dots n x m (where n and m are natural numbers) arranged vertically and horizontally inside the unit cell; a process of creating laser-marking information based on the code size, storage information, cell size and step size or number of dots; and a process of performing laser marking of the 2-dimensional code based on that laser-marking information.

12 Claims, 25 Drawing Sheets

2-dimensional code

Cell 2-dimensional code

Cell

Fig. 11
(A)
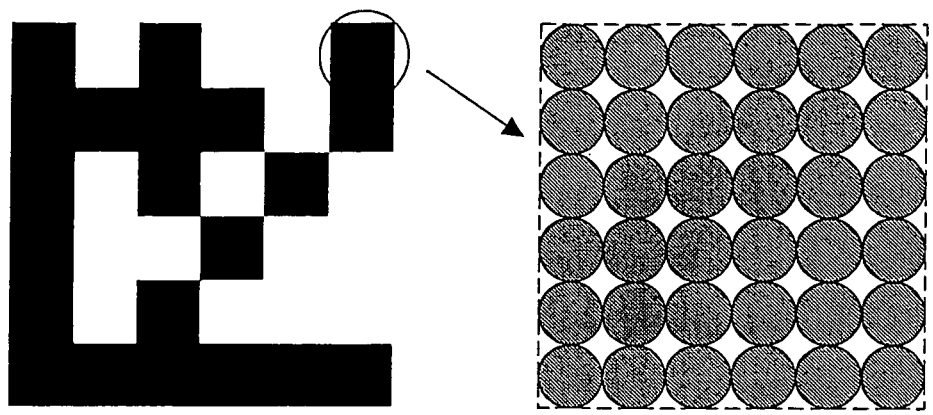
(B)
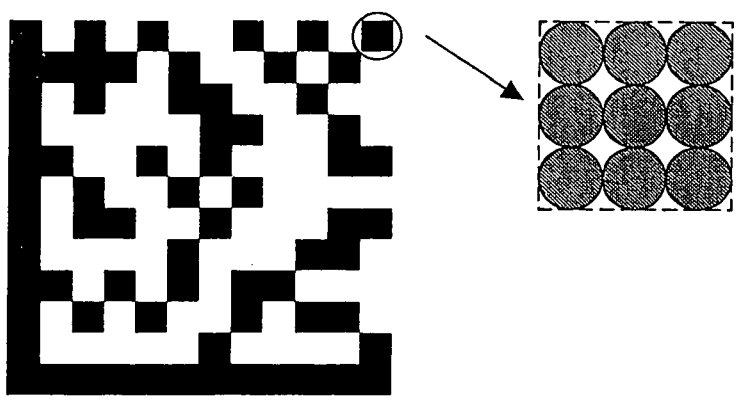
(C)
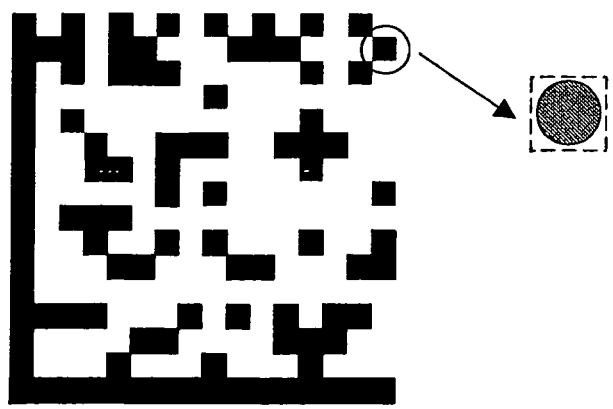

Fig. 12
(A) 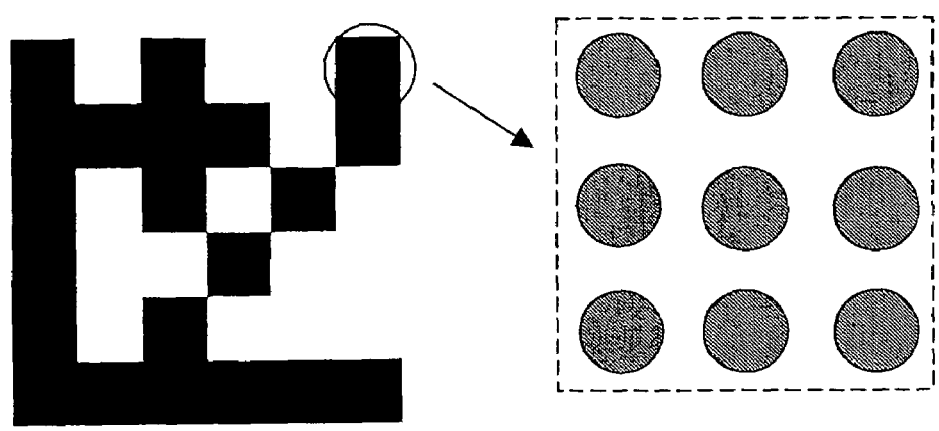
(B) 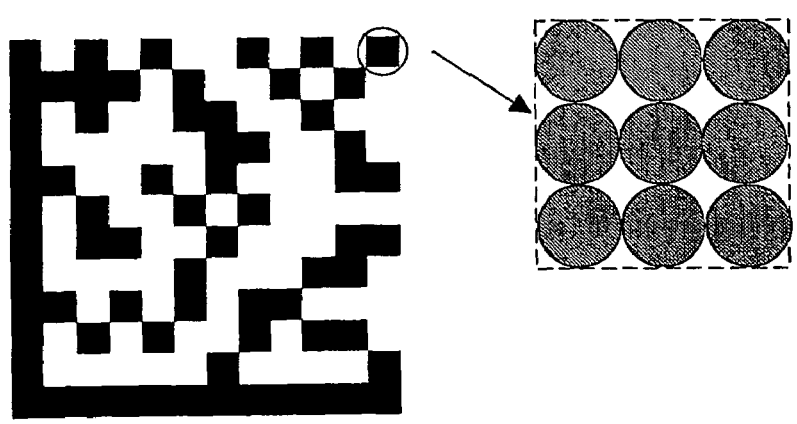

Fig. 13
| | Cell-number specification 'minimized' | Cell-number specification '22 x 22' |
|---|---|---|
| Encoded data 「01234」 | 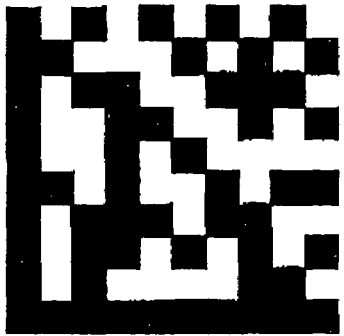 (a) |  (b) |
| Encoded data 「01234 56789」 | 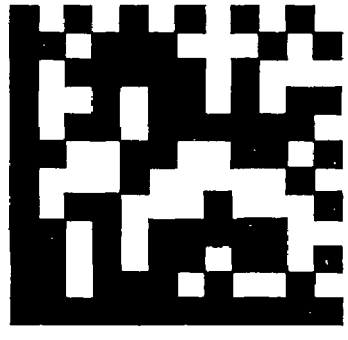 (c) |  (d) |

Fig. 19
(A)
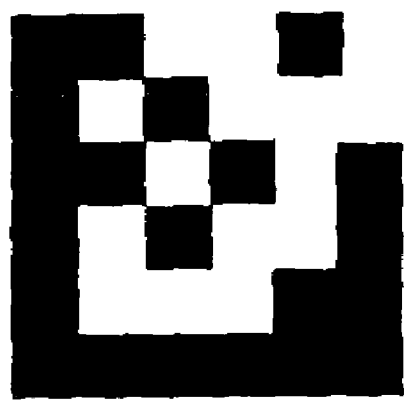
(B)
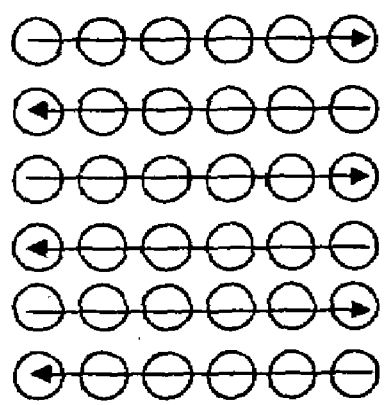

Fig. 28
(A) PRIOR ART
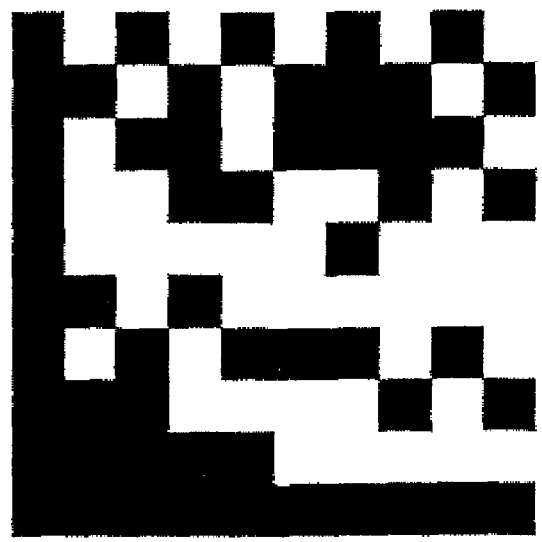
(B) PRIOR ART
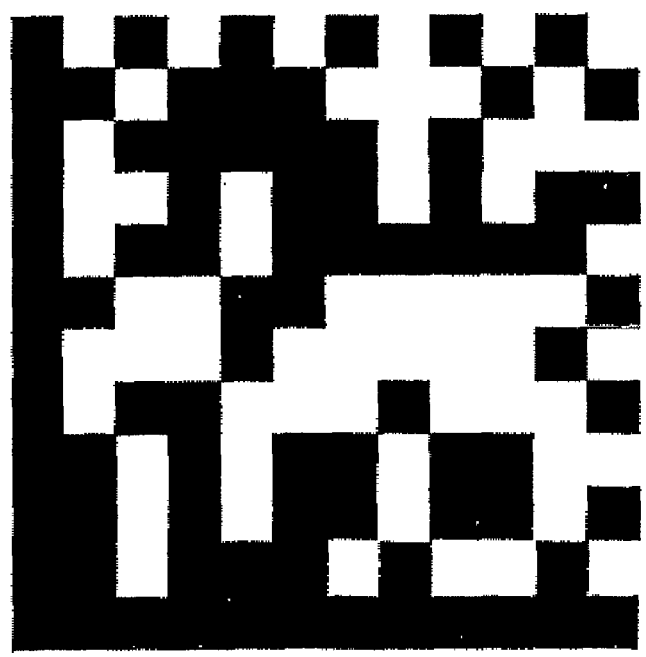

2-DIMENSIONAL CODE FORMATION METHOD AND FORMATION DEVICE

BACKGROUND OF THE INVENTION

1. Field of the Invention

This invention relates a formation method and formation device for forming 2-dimensional code using laser marking, and more particularly to a formation method and formation device for forming 2-dimensional code that is suitable for managing traceability of single products, or electronic or electrical equipment, machinery, automobiles, housing materials and the like that are made by assembling a plurality of parts, or all kinds of products that include these kinds of parts.

2. Description of the Related Art

When performing product quality control, manufacturing-history information, such as product-quality data for parts or raw materials that are used in manufacturing, adjustment data, which is used when adjusting manufacturing conditions such as temperature, time, dimension and the like, or when making product adjustments, or inspection data, which is obtained when inspecting products, is managed in a database of the product manufacturer.

In order to access the manufacturing histories for individual products that are recorded in this database, a product number is assigned to the product. For example, a nameplate may be attached to products such as electrical equipment, and the name of the manufacturer, product name and number (serial number), and the like are printed on that nameplate.

Also, in a case such as when there is an inquiry regarding product quality from a user who purchased a delivered product, by searching the database based on the serial number or the like, it is possible to access the manufacturing history of that product, and to provide that information.

Moreover, by accumulating defect information, claims or the like, and sending this information to the development and manufacturing departments as feedback, it is possible to reflect that information in the manufacturing process and prevent the manufacture of defective products.

Furthermore, there is known technology in which instead of accessing a database, the manufacturing-history information is converted to 2-dimensional code, and a printed label or the like on which this converted 2-dimensional code is printed is attached or applied to the product, and the product manufacturing-history information is obtained directly from that 2-dimensional code (refer to Japanese published patent application No. 2003-140726).

However, in the methods described above of storing manufacturing-history information in a database or 2-dimensional code, even though it was possible to obtain history information for a product, it was not possible to obtain history information for each individual part of the product.

Also, even though it may have been possible to identify a defective part from information such as defect information, claims or the like, it was not possible to obtain the manufacturing-history information for that defective part, or it took a long time to access the manufacturing-history information for a defective part, so there were problems in that it was not possible to effectively avoid manufacturing defective parts, or it took a long time until it was possible to avoid manufacturing defective parts. Also, it required much time to respond to inquiries or claims from a consumer regarding product quality.

In the case of 2-dimensional code, the code size is changed according to the amount of information. For example, in the case where the cell size is 1 mm and the data to be coded is '01234', the 2-dimensional code that is generated is as shown in FIG. 28A. The 2-dimensional code that is shown in FIG. 28A is 10 cells (vertical)×10 cells (horizontal), and the overall size is 10 mm×10 mm. On the other hand, in the case where the data to be coded is '0123456789', the 2-dimensional code that is generated is as shown in FIG. 28B. The 2-dimensional code shown in FIG. 28B is 12 cells (vertical)×12 cells (horizontal), and the overall size is 12 mm×12 mm. The size of the 2-dimensional code differed in this way according to the amount of stored information.

In order to mark different data using the same size, technology has been proposed in which first, the code size is specified, and then it is possible to form 2-dimensional code having a desired size (see Japanese published patent application No. H11-167602).

However, in the prior art disclosed in the aforementioned patent document 1, laser marking is performed for cells that will be black cells using a spiral-shaped plotted pattern, so there is a problem in that controlling the operation of the laser device becomes difficult. Also, by specifying the code size, it is possible for 2-dimensional code to have a desired size, however, since spiral-shaped laser printing is performed, in order to print the specified size, it is necessary to control the operation of the laser with high precision. Furthermore, since laser marking is performed using a spiral-shaped plotted pattern, there is a problem in that forming an extremely minute 2-dimensional code becomes difficult.

SUMMARY OF THE INVENTION

It is the object of the present invention to provide a 2-dimensional code format ion method and formation device capable of forming 2-dimensional code, having a desired size and using simple device construction and high precision, regardless of the amount of information such as text or images to be written in the code.

Moreover, it is the object of the present invention to provide a 2-dimensional code formation method and formation device that make it possible to effectively avoid the manufacture of defective products by attaching 2-dimensional code to a single product or to each individual part of a product, and reflecting that 2-dimensional code in the manufacturing process, and to quickly respond to inquiries or claims from consumers regarding product quality.

The aforementioned problems are solved by a method of forming 2-dimensional code of a first claim of the invention that comprises: a step of specifying the code size for the 2-dimensional code; a step of specifying storage information to be written in the 2-dimensional code; a step of setting the cell size for a unit cell of the 2-dimensional code; a step of specifying the dot step size or number of dots n×m (where n and m are natural numbers) to be arranged vertically and horizontally inside the unit cell; a step of generating laser-marking information based on the code size, storage information, cell size and step size or number of dots; and a step of laser marking 2-dimensional code based on the laser-marking information.

Construction can also be such that the cell size of said unit cell is changed according to the code size and storage information.

Construction can also be such that the cell size of the unit cell is calculated based on a preset number of cells.

With the 2-dimensional code formation method of this invention, the cell size is set according to the specified code size and specified information; and by doing so, it is possible to form 2-dimensional code having a specified size regardless on the amount of information. Also, in the 2-dimensional code formation method of this invention, the cells to be laser marked are divided into a grid having n rows and n columns or m rows and n columns according to the specified step size or number of dots, and dots are laser marked within this grid. In this way, laser marking of a unit cell is performed by dot marking, so it is possible to prevent marking errors such as protruding out of the marked area to the right or left, or the occurrence of blank areas. Furthermore, by changing the cell size, it is possible to store different amounts of information in 2-dimensional code having the same size, so it becomes possible to attach the desired information as 2-dimensional code without being limited by the amount of surface area of the marking location. Also, since laser marking is performed using dots, for example, 1 dot per cell, it is possible to create 2-dimensional code having a very small size.

Moreover, by specifying the code size and number of cells, the size of the unit cells of the 2-dimensional code is unified, so a reader can read information by reading cells all having the same size.

Also, the 2-dimensional code formation method of this invention is a method of forming 2-dimensional code on a product including a single part or a plurality of parts, and comprising: a manufacturing-history-information-acquisition step of acquiring manufacturing-history information for a part; a 2-dimensional-code-conversion step of converting data that includes an ID number for identifying manufacturing-history information or includes the manufacturing-history information for the part into 2-dimensional code; a parameter-setting step of setting the size of the converted 2-dimensional code according to the part; and a laser-marking step of laser marking 2-dimensional code having a set size directly on the part by a laser maker.

Since manufacturing-history information is acquired for all of the component parts of a product made from a single part or a plurality of parts, the size of the 2-dimensional code, which is data that includes an ID number for accessing manufacturing-history information or includes the manufacturing-history information itself that has been converted to 2-dimensional code, is set according to the part/parts, the set 2-dimensional data is laser marked directly on the part/parts by a laser marker, and the product that is made from the marked part/parts is manufactured, when there is a problem with a product, by identifying the defective part, it is possible to know the ID number by reading the 2-dimensional code that is attached to that defective part.

It is possible to access the manufacturing-history information based on that ID number. Also, by marking 2-dimensional code that includes a large amount of information related to materials, manufacturing conditions, and finished product quality, it is possible to quickly handle inquiries or claims related to product quality by directly reading that 2-dimensional code without having to access separately stored manufacturing-history information.

Also, since the 2-dimensional code is set according to the size of the part or the like, it is possible to mark 2-dimensional code regardless of the size of the part. By making the size of the 2-dimensional code very small for a very small part, and marking the part with that 2-dimensional code, or by freely setting the size of the 2-dimensional code for very large parts and marking the part with that 2-dimensional code, it is possible to attach 2-dimensional code to all parts, and to access manufacturing-history information from that 2-dimensional code.

Also, by marking 2-dimensional code that includes a large amount of information related to material, manufacturing conditions, and finished product quality, by directly reading that 2-dimensional code without having to access separately stored manufacturing-history information, it becomes possible to quickly respond to inquiries or claims related to product quality.

Moreover, in the laser-marking process, it is possible to form the 2-dimensional code based on the size of 2-dimensional code that was set in the parameter-setting process, by forming: unit cells in which dots that are formed by laser-beam irradiation are arranged vertically and horizontally n×m (where n and m are natural numbers); unit cells in which a rectangular shape is filled in by continuous laser-beam irradiation; or unit cells that are contained within a rectangular shape by continuous laser-beam irradiation.

Marking 2-dimensional code in this way can be performed by various methods. Particularly, in marking using dots (so-called dot marking), by arranging dots inside a cell vertically and horizontally, it is possible to form cells having a uniform depth, so it is possible to improve the precision for reading the 2-dimensional code.

Also, it is preferable that the laser-marking step includes a step of reading the 2-dimensional code that was laser marked and checking whether or not marking of the 2-dimensional code is correct.

The device that makes possible the aforementioned 2-dimensional code formation method comprises: information-acquisition means for acquiring the code size of 2-dimensional code, storage information that is to be written in the 2-dimensional code, and the dot step size or number of dots n×m (where n and m are natural numbers) that are arranged vertically and horizontally inside a unit cell of the 2-dimensional code; calculation means for performing a process of calculating the cell size of the unit cell based on the code size and storage information, and a process of generating laser-marking information based on the code size, storage information, cell size and dot step size or number of dots; and laser-marking means for performing laser marking of 2-dimensional code based on the laser-marking information.

It is preferable that in the calculation means it be possible to perform a process of changing the cell size of the unit cell based on change information for the storage information that was acquired by the information-acquisition means, and to generate 2-dimensional code having the same size by changing the cell size of the unit cell even when the storage information has been changed.

Also, the calculation means performs a process of generating different laser-marking information based on change information for the step size or number of dots that was acquired by the information-acquisition means.

Moreover, the 2-dimensional code formation device comprises: information-acquisition means for acquiring the code size of 2-dimensional code, storage information that is to be written in the 2-dimensional code, the number of unit cells of the 2-dimensional code, and the dot step size or number of dots n×m (where n and m are natural numbers) arranged vertically and horizontally inside a unit cell of the 2-dimensional code; calculation means for performing a process of calculating the cell size based on the code size and number of cells, and a process of generating laser-marking information based on the code size, storage information, cell size, and dot step size or number of dots; and laser-marking means for performing laser marking of 2-dimensional code based on the laser-marking information.

Here, it is preferable that the calculation means is able to perform a process of changing the cell size of unit cells based on change information for the number of cells that was acquired by the information-acquisition means, and to generate 2-dimensional code of the same size by changing the cell size of the unit cell even when the number of cells is changed.

Also, the calculation means performs a process of generating different laser-marking information based on change information for the step size or number of dots that was acquired by the information-acquisition means, and generates 2-dimensional code having different density when the step size or the number of dots is changed.

Moreover, the 2-dimensional code formation device of this invention is a device that forms 2-dimensional code on a product that is made from a single part or a plurality of parts, and comprises: means for acquiring manufacturing-history information for the part/parts of the product; means for storing the acquired manufacturing-history information; means for converting data, which includes an ID number identifying the manufacturing-history information, or includes the manufacturing-history information, to 2-dimensional code; and means for performing laser marking of 2-dimensional code directly on the part/parts based on the size of 2-dimensional data that was set for the part/parts.

BRIEF DESCRIPTION OF THE DRAWINGS

FIG. 9 is a drawing for explaining information that is encoded in 2-dimensional code.

FIGS. 11A, 11B and 11C are drawings that show 2-dimensional code having the same code size, but a different number of cells and storage information.

FIGS. 12A and 12B are drawings that show 2-dimensional code having the same code size, but a different number of cells and storage information.

FIGS. 13A, 13B, 13C and 13D are drawings that show 2-dimensional code have the same code size and storage information, but a different number of cells.

FIG. 16 is a drawing that shows an example of an information-input screen for creating 2-dimensional code.

FIGS. 19A and 19B are drawings for explaining the dot marking process.

FIGS. 22A and 22B are drawings for explaining the 2-dimensional code of this invention.

FIG. 23 is a drawing that shows the operation processes of this invention.

FIG. 25 is a drawing for explaining the cells of this invention.

FIGS. 28A and 28B are drawings for explaining an example of prior art.

DESCRIPTION OF THE PREFERRED EMBODIMENTS OF THE INVENTION

The preferred embodiments of the invention will be explained below based on the drawings. The materials, arrangements and the like explained below do not limit the invention, and can be changed in various ways within the scope of the invention.

The 2-dimensional code of the embodiments is formed using a dot-marking method such that light-colored and dark-colored unit cells are arranged in a matrix shape. It is possible to use a data matrix, QR code or the like as the format for the 2-dimensional code.

The dot-marking method is a method of generating 2-dimensional code by forming a plurality of dots on the object to be marked, and in this specification, includes both laser-marking methods and printing methods.

Figure 3:
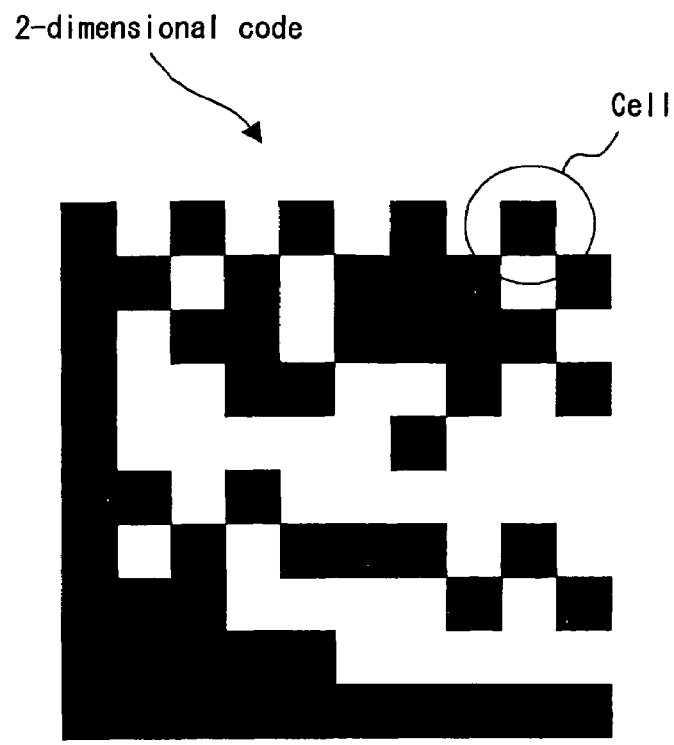
FIG. 3 is a drawing that shows an example of 2-dimensional code.
Figure 4:
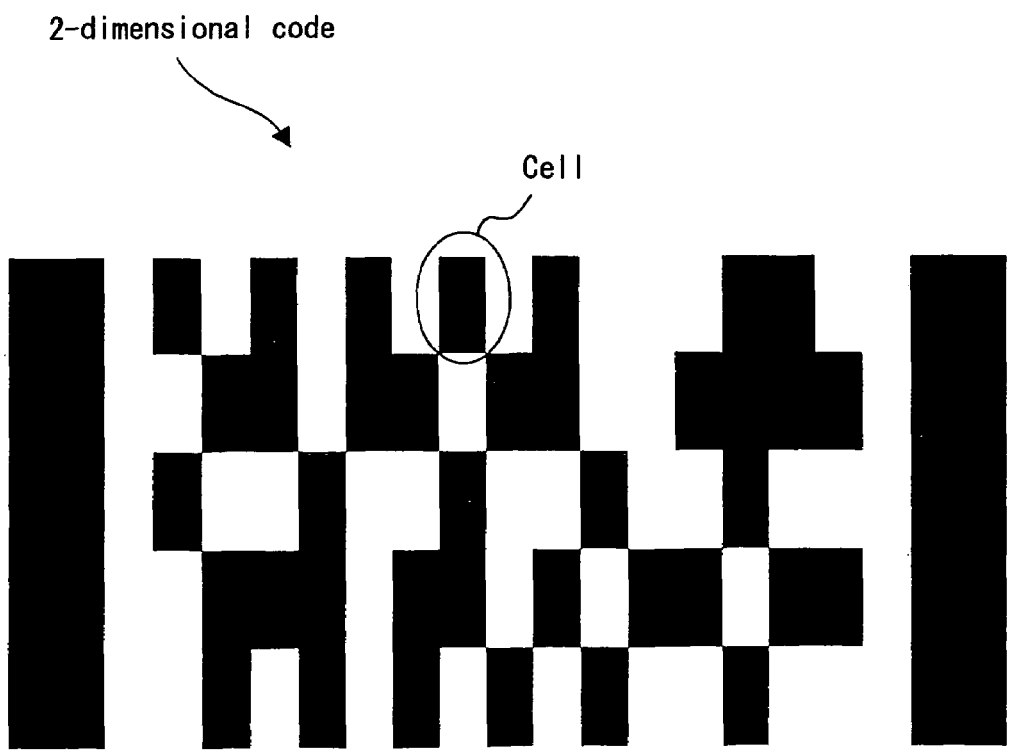
FIG. 4 is a drawing that shows an example of 2-dimensional code.

FIG. 3 and FIG. 4 show examples of 2-dimensional code. The 2-dimensional code displays data that is expressed in a pattern of light and dark by combining white and black cells that have been arranged in a matrix shape. The 2-dimensional code formation device of this embodiment employs the so-called dot-marking method for forming the black cells of the 2-dimensional code.

Figure 5:
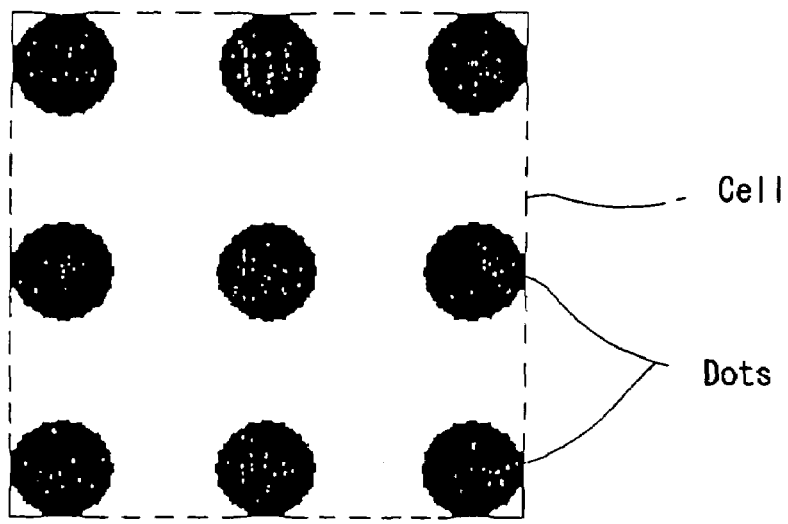
FIG. 5 is a drawing for explaining a dot-marked cell.

In the case of generating the 2-dimensional code shown in FIG. 3 using dot marking, the unit cell has a square shape, so as shown in FIG. 5, the unit cell that will become a black cell is formed by laser marking n×m (where n and m are natural numbers) circular dots in the vertical and horizontal direction. The circular dots can be arranged inside the cell by irradiating a laser beam intermittently while controlling the location irradiated by the laser-beam. Instead of being circular in the planar view, the dots could also be rectangular in the planar view.

Figure 6:
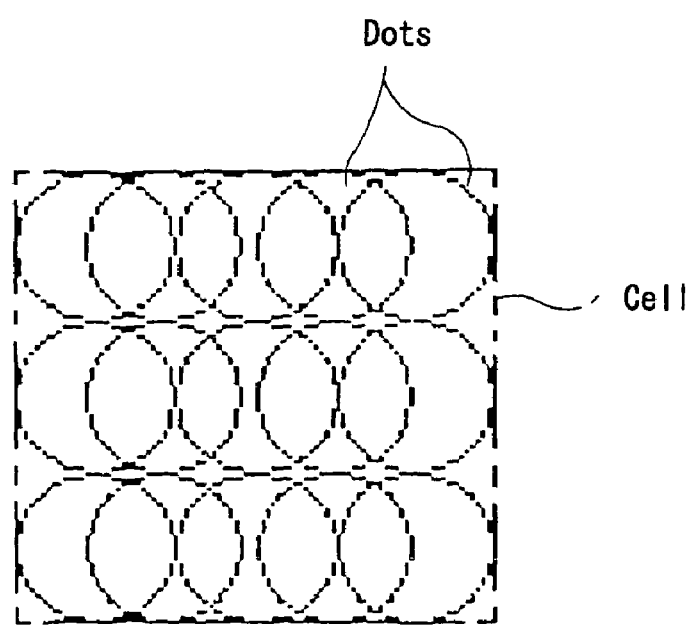
FIG. 6 is a drawing for explaining a vector-marked cell.

Also, instead of arranging one or a plurality of dots inside one cell, it is possible to set more than the number of dots that will fit in one cell, and perform marking using the so-called vector-marking method. As shown in FIG. 6, in vector marking, the 2-dimensional code is formed by irradiating a laser such that the dots overlap. Also, the 2-dimensional code can be formed by moving the location of irradiation of the laser beam in the vertical or horizontal direction while continuously performing irradiation with the laser beam, to fill in the cell with a line having the width of the beam.

Figure 7:
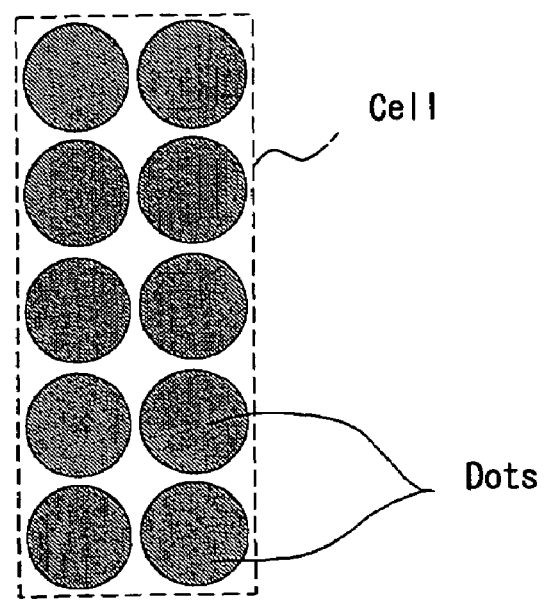
FIG. 7 is a drawing for explaining a dot-marked cell.
Figure 8:
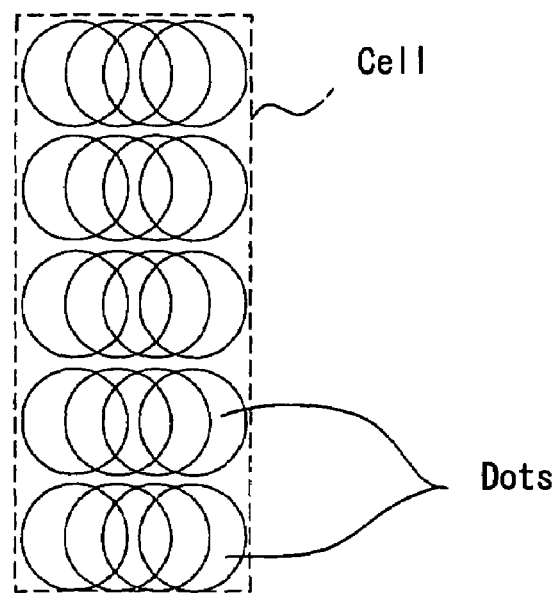
FIG. 8 is a drawing for explaining a vector-marked cell.

Also, in the case of creating the 2-dimensional code shown in FIG. 4 using dot marking, the unit cell is a rectangle, so as shown in FIG. 7, a cell that will become a black cell is formed by laser marking n×m (where n and m are natural numbers) circular dots in the vertical and horizontal direction. When doing this, vector marking can also be performed as shown in FIG. 8.

Figure 1:
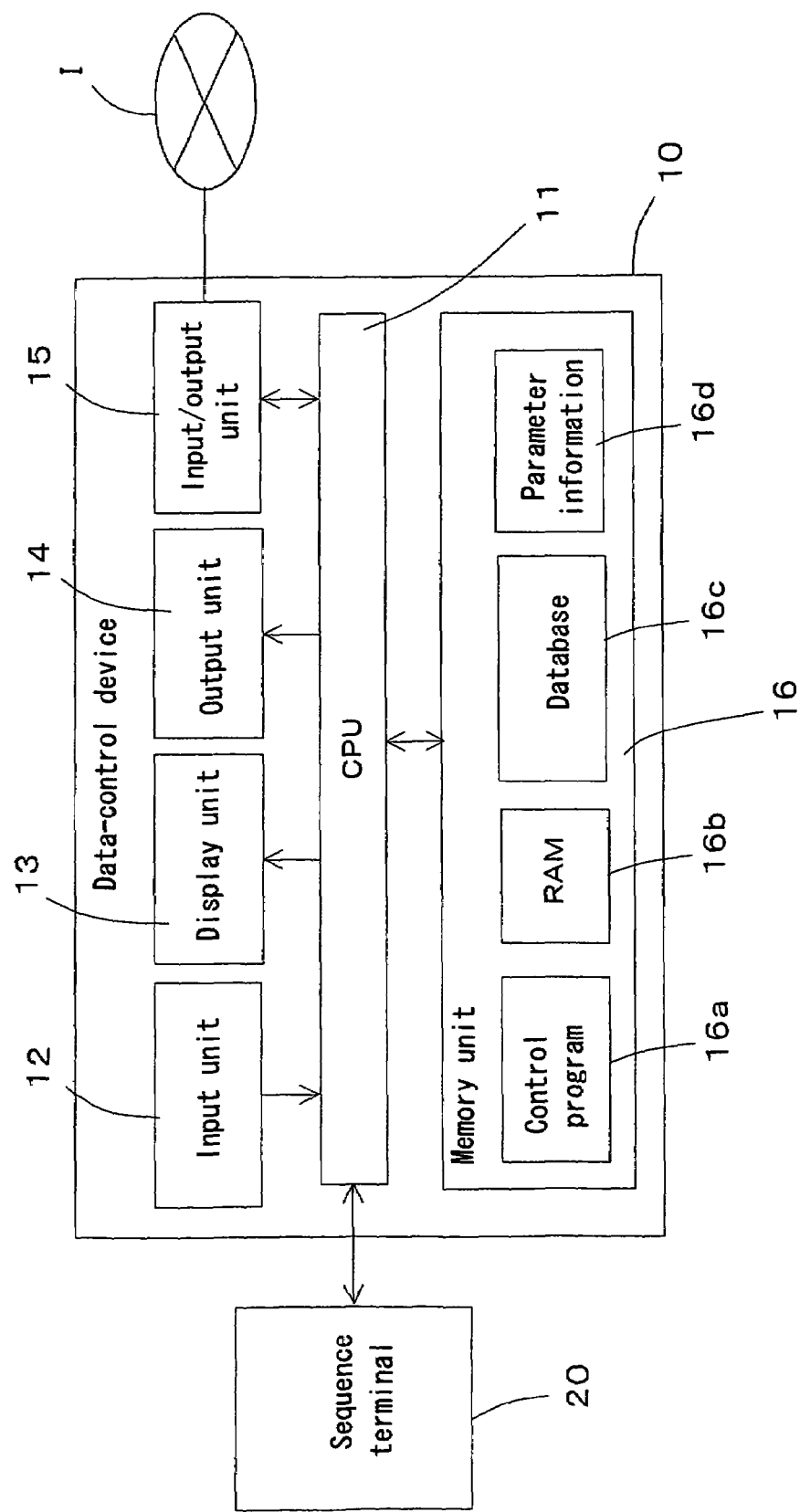
FIG. 1 is a drawing for explaining the overall construction of the laser-marking device of a first embodiment of the invention.

FIG. 1 is a drawing for explaining the overall construction of the laser-marking device of the invention.

This laser-marking device is a device that can suitably be used for marking a marking pattern such as 2-dimensional code, text, graphics, symbols, images and the like on work (object to be marked) W, and mainly comprises a data-control device 10 and laser marker 40.

The data-control device 10 comprises: a CPU 11 that performs various control; an input unit 12 having a keyboard, mouse or the like; a display unit 13 having a monitor, LCD or the like; an output unit 14 having an input/output device or the like that outputs to a printer or electronic-memory medium; an input/output unit 15 having a modem or the like; and a memory unit 16 having a HDD, memory or the like. The memory unit 16 stores a control program 16a, RAM 16b that is used as a work area, a database 16c in which product-history information for a product 72 used in traceability management (described later) is saved, and parameter information 16d in which various parameters used when performing laser marking are saved.

It is also possible to store the database 16c in a separate device, and to access the database 16c from the data-control device 10. Also, construction is possible in which the database 16c is copied and stored in an external device (not shown in the figure) when handling inquiries regarding product quality, claims or the like.

Furthermore, information that is input from the input/output unit 15 and stored in the memory unit 16 includes: code size, storage information that is written in the code, step size of the dots that are arranged in a unit cell of the code, information about the material to be marked, etc. The step size is the distance between the centers of dots that are laser marked on the material to be marked. Also, when the number of cells is fixed, information relating to the number of cells is input from the input/output unit 15. Of the input information, the input for settings for generating 2-dimensional code will be explained in detail.

Also, the input/output unit 15 can be connected to a communication network I, and the data-control device 10 can then receive various information such as manufacturing-history information of a product from an external communication terminal via the communication network I. Also, the data-control device 10 can access the communication terminal via the communication network I and download manufacturing-history information, and then store it in the database 16c.

Based on the control program 16a, the CPU 11 stores the manufacturing-history information for the product 72 that was received via the input/output unit 15 in the database 16c of the memory unit 16. Also, the CPU 11 can obtain from the input unit 12 data that has been manually input or data that is stored on an electronic medium, and then store that data in the database 16c. The CPU 11 converts the data stored in the database 16c into 2-dimensional code based on input from the operator, and sends a control signal for performing marking to the data-control device 10 via a sequence terminal 20.

Figure 2:
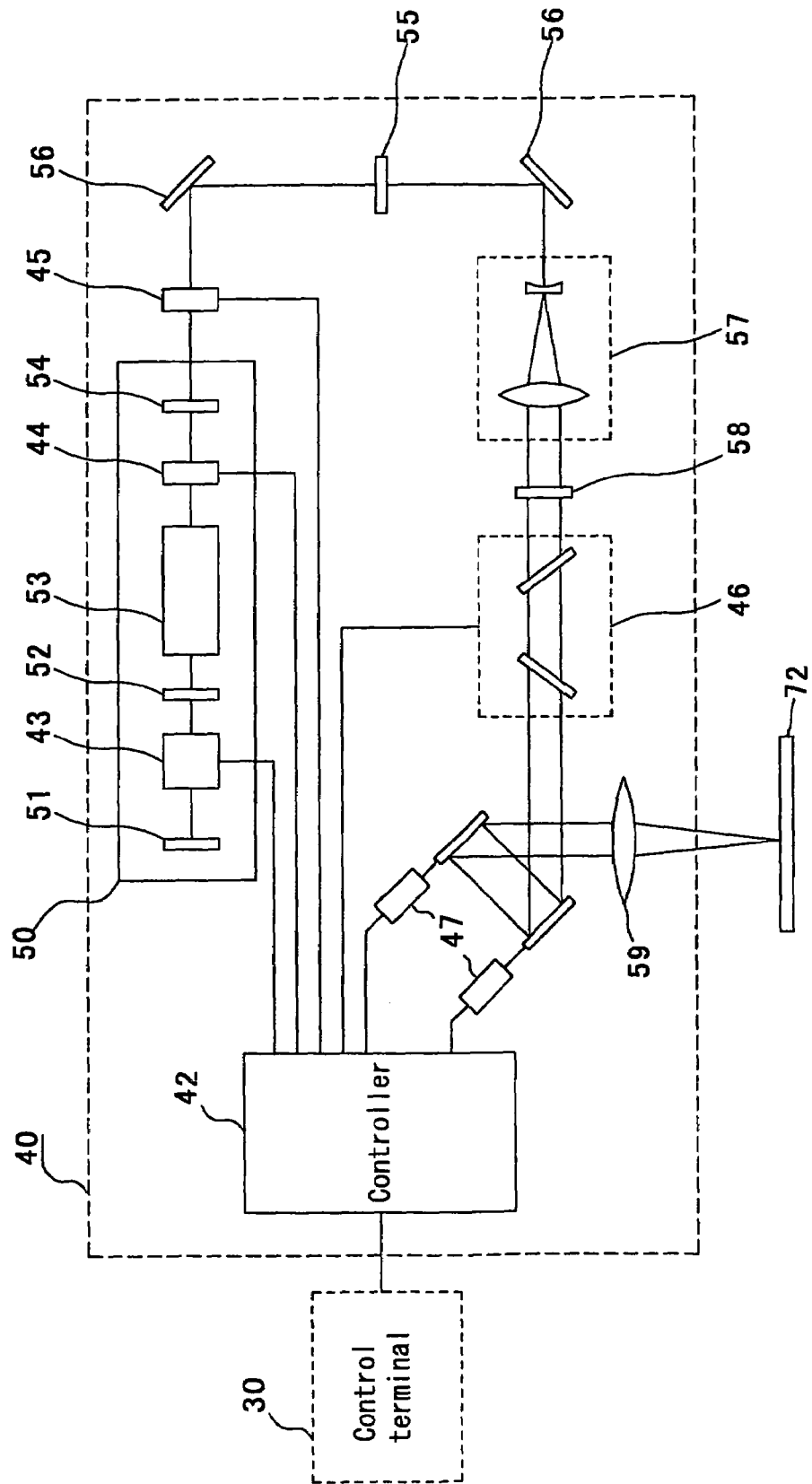
FIG. 2 is a drawing for explaining the construction of a laser marker of the first embodiment of the invention.

FIG. 2 shows the construction of the laser marker 40. In order for the laser marker 40 to perform marking of dots having a prescribed depth and that are circular in the planar view, for example, on the product 72 according to a control signal from the data-control device 10, a controller 42 controls an ultrasonic wave Q switching element 43, internal shutter 44, external shutter 45, attenuator (optical attenuator) 46 and galvanometer mirror 47, and performs marking of one dot using one or a plurality of Q switch pulses.

Also, in the same figure, reference number 51 is a full reflective mirror, 52 is a internal aperture (mode selector), 53 is a lamp housing, 54 is an output mirror, 55 is an aperture, 56 is a leveling mirror, 57 is a Galilean expander, 58 is an aperture, 59 is an f-θ lens, and 50 is a laser oscillator.

The CPU 11 performs the required data processing according to a program, and controls each of the units inside the device. The CPU 11 of this embodiment performs processing for calculating the cell size based on the specified code size and storage information, or based on the specified code size and number of cells. Moreover, based on the specified code size, storage information, cell size and step size, the CPU 11 performs processing for generating laser marking information for the laser marker 40 to perform laser marking. Furthermore, when the storage information and step size are changed, the CPU 11 performs processing for changing the laser marking information based on the changed information.

The CPU 11 performs calculation for generating 2-dimensional code using the specified size. The CPU 11 calculates the size of the cells of the 2-dimensional code based on the specified code size and amount of information that is stored, or the specified code size and the number of cells. In the case of calculated the cell size from the specified code size and amount of stored information, the cell size is found by dividing the specified code size by the number of code when encoding the storage information into 2-dimensional code.

Figure 9:
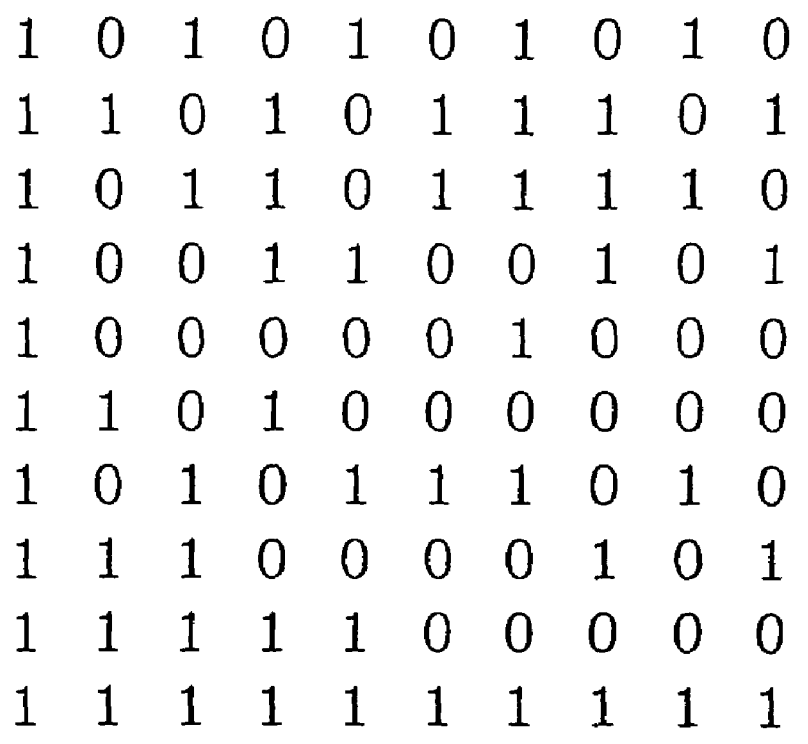

For example, suppose that the code size is specified as 5 mm×5 mm, and the storage information is '01234'. In this case, as shown in FIG. 9, when encoding '01234' into 2-dimensional code, it is represented using the numbers 0 or 1 arranged in a 10 (vertical)×10 (horizontal) matrix form. The cell size at this time is found to be 5 mm/10=0.5 mm (vertical), and 5 mm/10=0.5 mm (horizontal).

In the case where the code size and number of cells are specified, the cell size is found by dividing the specified code size by the number of cells. For example, when the code size is specified as 5 mm×5 mm, and the number of cells is specified as 20 (vertical)×20 (horizontal), the cell size is found to be 5 mm/20=0.25 mm (vertical) and 5 mm/20=0.25 (horizontal).

Furthermore, the CPU 11 acquires information related to the step size of the dots that are laser marked in each cell, and creates laser-marking information based on the code size, storage information, cell size and step size. The laser-marking information is information that gives instructions to the laser marker 40 of how to mark the material to be marked, and it includes parameter information such as dot coordinate information, laser wavelength, Q switch frequency, laser power, dot density, dot irradiation time, number of markings, etc.

The laser-marking information created by the CPU 11 is sent to the laser marker 40. On the side of the laser marker 40, the controller controls each of the units based on the sent laser-marking information, and the laser marker 40 performs laser marking according to the laser-marking information. The laser marker 40 reads the coordinate information for each of the dots from the received laser-marking information, and performs laser marking of the material to be marked based on that coordinate information.

Figure 10:
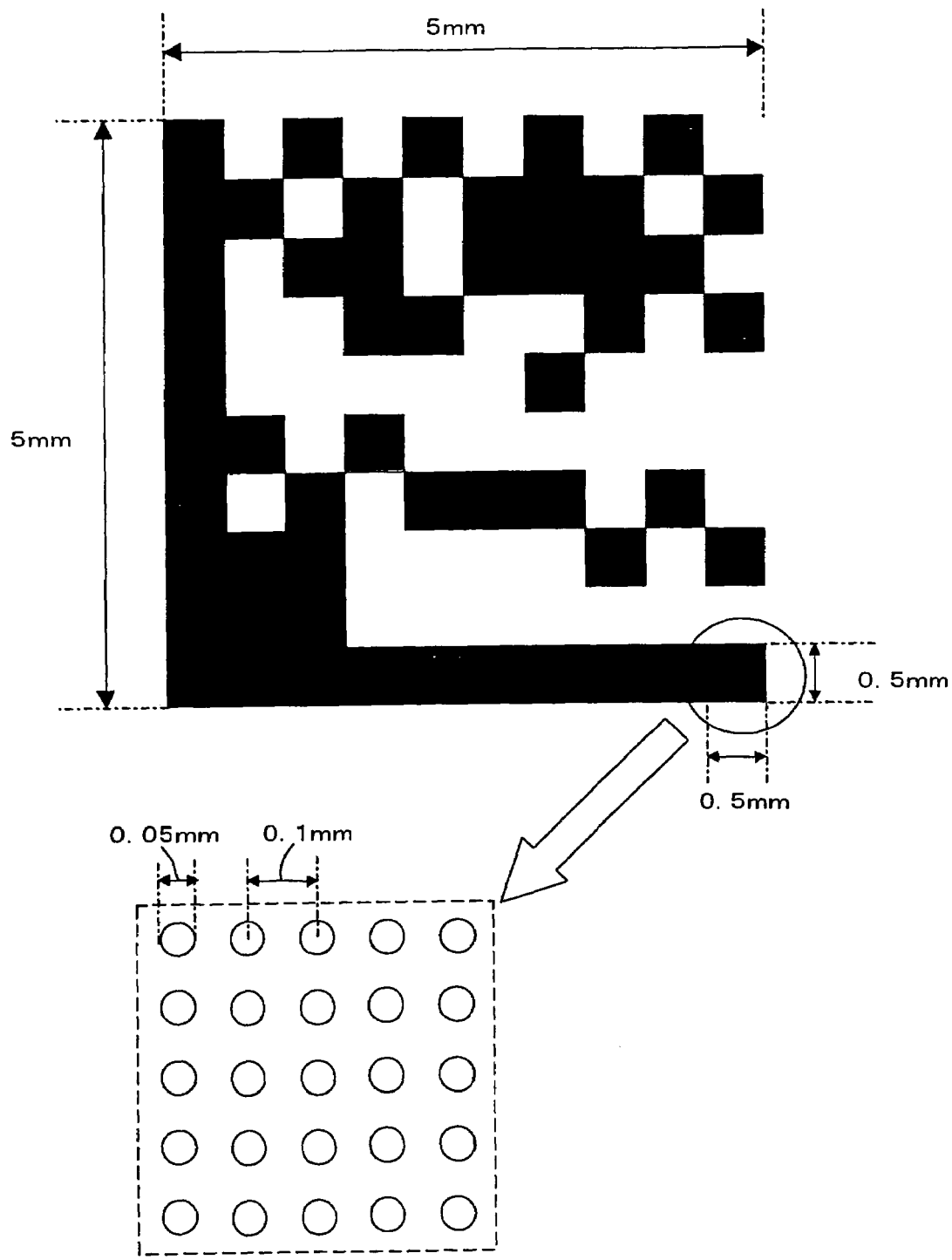
FIG. 10 is a drawing that shows an example of 2-dimensional code created based on input information.

FIG. 10 shows an example of 2-dimensional code that was generated based on information that was input by the user. The 2-dimensional code that is shown in the figure has a code size of 5 mm (vertical)×5 mm (horizontal) that was specified by the user, a cell size of 0.5 mm×0.5 mm that was calculated according to the amount of input information, a dot diameter of 0.05 mm formed by laser marking, and a step size of 0.1 mm that was specified by the user.

As shown in FIGS. 11A, 11B and 11C, with the 2-dimensional code formation method of this invention, regardless of how small or large the amount of data contained in the 2-dimensional code is, it is possible to keep the size of the 2-dimensional code fixed. In other words, when the amount of data is small as shown in FIG. 11A, the entire number of cells of the 2-dimensional code decreases, however, the size of the unit cell becomes large. In this case, the unit cell is constructed with dots that are arranged 6×6. On the other hand, when the amount of data is large as shown in FIG. 11B, the entire number of dots of the 2-dimensional code increases, however, the size of the unit cell becomes small. In this case, the unit cell is constructed with dots that are arranged 3×3. In FIGS. 11A and 11B, the size and step size of each of the dots is set to be the same.

In this way, it is possible to fix the size of the 2-dimensional code regardless of whether the amount of data is large or small, so even in the case where there is only limited space for marking, the size of the 2-dimensional code does not increase according to the amount of data, so it is possible to include all of the necessary data in the 2-dimensional code. This embodiment is an example in which the size and step size of the dots is fixed, however, of course it is also possible to change the size and step size of the dots, and suitably set the unit cell. For example, as shown in FIG. 12A, in the case where the dots in 1 cell are arranged 3×3, by making the step size small, it is possible to make the cell size small as shown in FIG. 12B. By changing the step size in this way, it is possible to correspond to increases or decreases in the number of unit cells.

When changing the step size, as the step size becomes larger, the dot density becomes coarser, so it is possible to increase the density of the code. In this way, even for the same 2-dimensional code, it is possible to adjust the code density by increasing or decreasing the step size.

Also, in the case where the step size is zero, or in other words, when there is only one dot per cell as shown in FIG. 11C, it is possible to increase the number of unit cells by decreasing the cell size, and thus it is possible to store more information using 2-dimensional code. In this state, by making the size of the dots small, it is possible to further increase the number of unit cells, and thus it is possible to store more information. Moreover, by performing laser marking so that there is only 1 dot per cell, it becomes possible to form 2-dimensional code at high speed.

When there is 1 dot per cell, it is necessary that dot marking be performed within a unit cell such that the unit cell can be recognized. In other words, as the cell size increases, it is necessary that the size of the dot formed inside the unit cell become larger. In order to do this, a dot with an suitable size can be formed inside a unit cell by specifying optimal values for the laser wavelength, laser power, Q switch frequency, dot irradiation time, number of markings, and the like according to the material to be marked and the cell size, or by replacing the lens of the laser marker 40.

FIGS. 13($a$) to 13($d$) are drawings that show 2-dimensional code for which the code size and number of cells are set in advance. FIGS. 13($a$) and 13($b$), and FIGS. 13($c$) and 13($d$) have the same code size and storage information, however, the number of cells is different. In other words, in FIGS. 13($a$) and 13($b$) the information is the same '01234', however, the number of cells in FIG. 13($a$) is 10 (vertical)×10 (horizontal), and the number of cells in FIG. 13($b$) is 22 (vertical)×22 (horizontal). Also, in FIGS. 13($c$) and 13($d$) the same information '0123456789' is stored, however, the number of cells in FIG. 13($c$) is 10 (vertical)×10 (horizontal), and the number of cells in FIG. 13($d$) is 22 (vertical)×22 (horizontal). In the case where the number of cells is specified in advance in this way, it is possible for the 2-dimensional code to perform a display related to the same information within the range of the specified number of cells. However, when the number of cells is specified, the maximum amount of information that can be stored is limited.

When forming 2-dimensional code, by specifying the number of cells, it is possible to form the 2-dimensional code so that it always has the same number of cells regardless of the amount of information. Therefore, when reading the 2-dimensional code, it is possible for the reader to always read code having the same cell size, thus making it possible to simplify adjustment when reading, and to accurately read data.

Figure 14:
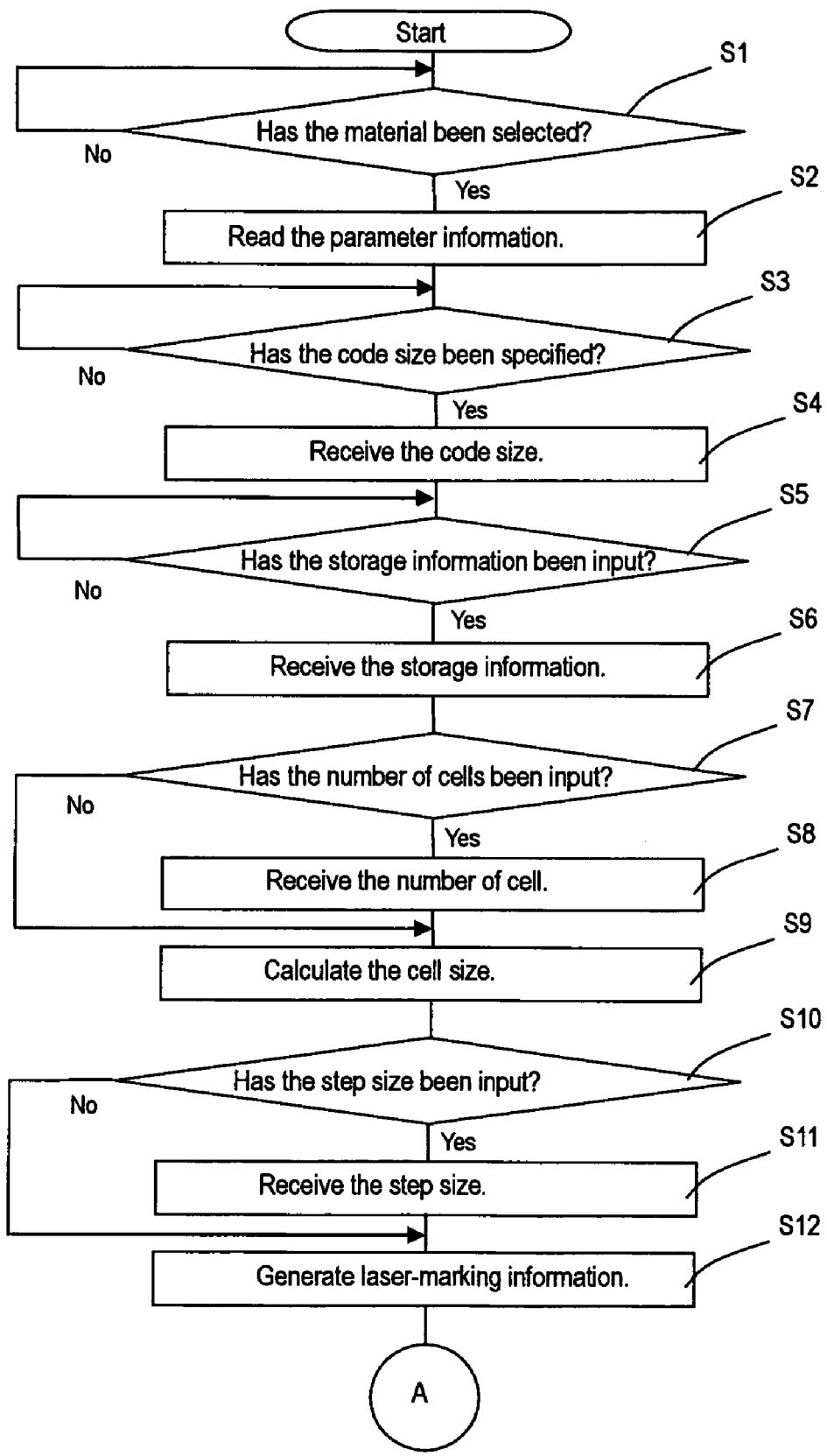
FIG. 14 is a flowchart showing the processing flow for inputting settings for creating 2-dimensional code.
Figure 15:
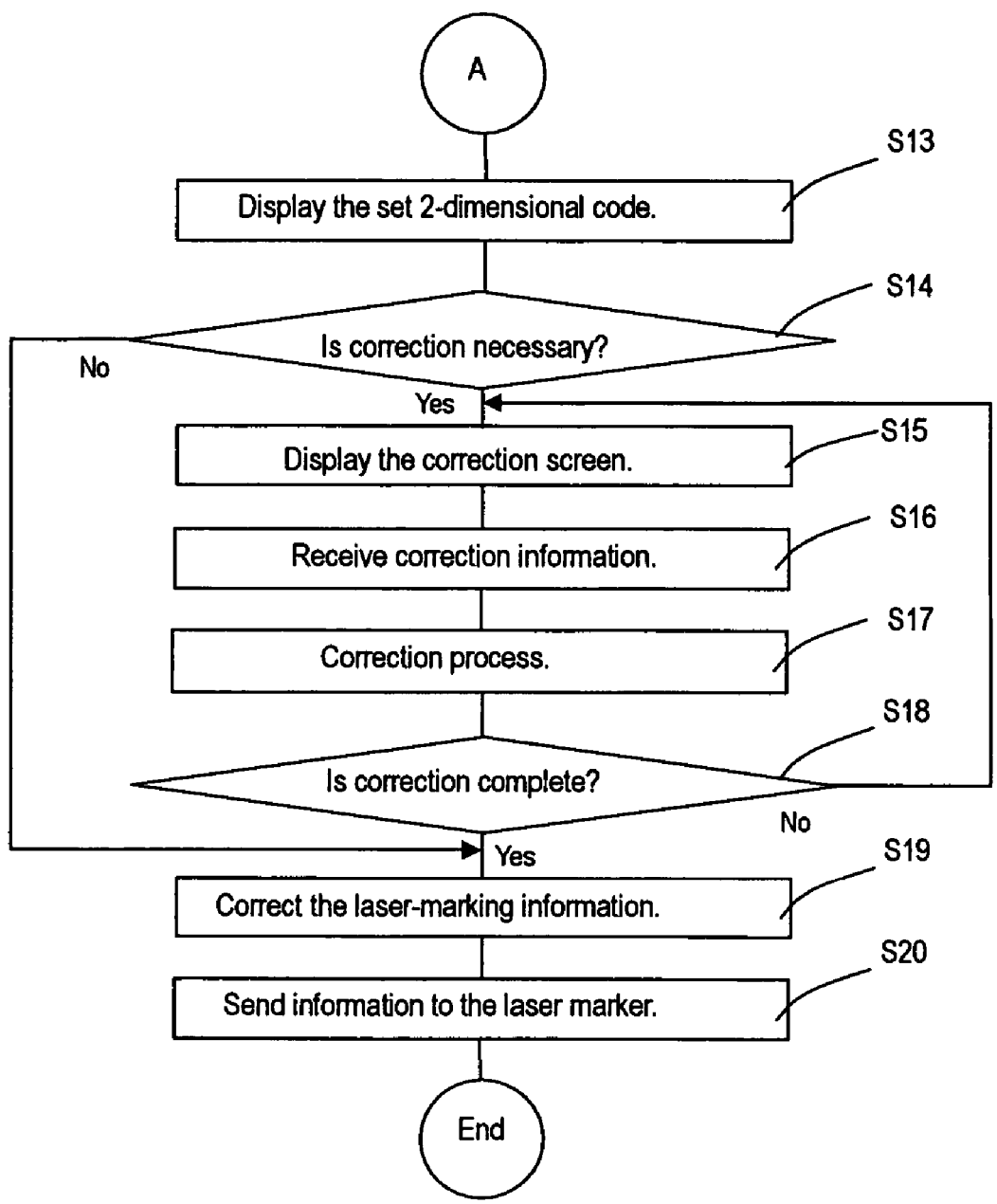
FIG. 15 is a flowchart showing the processing flow for inputting settings for creating 2-dimensional code.
Figure 1:
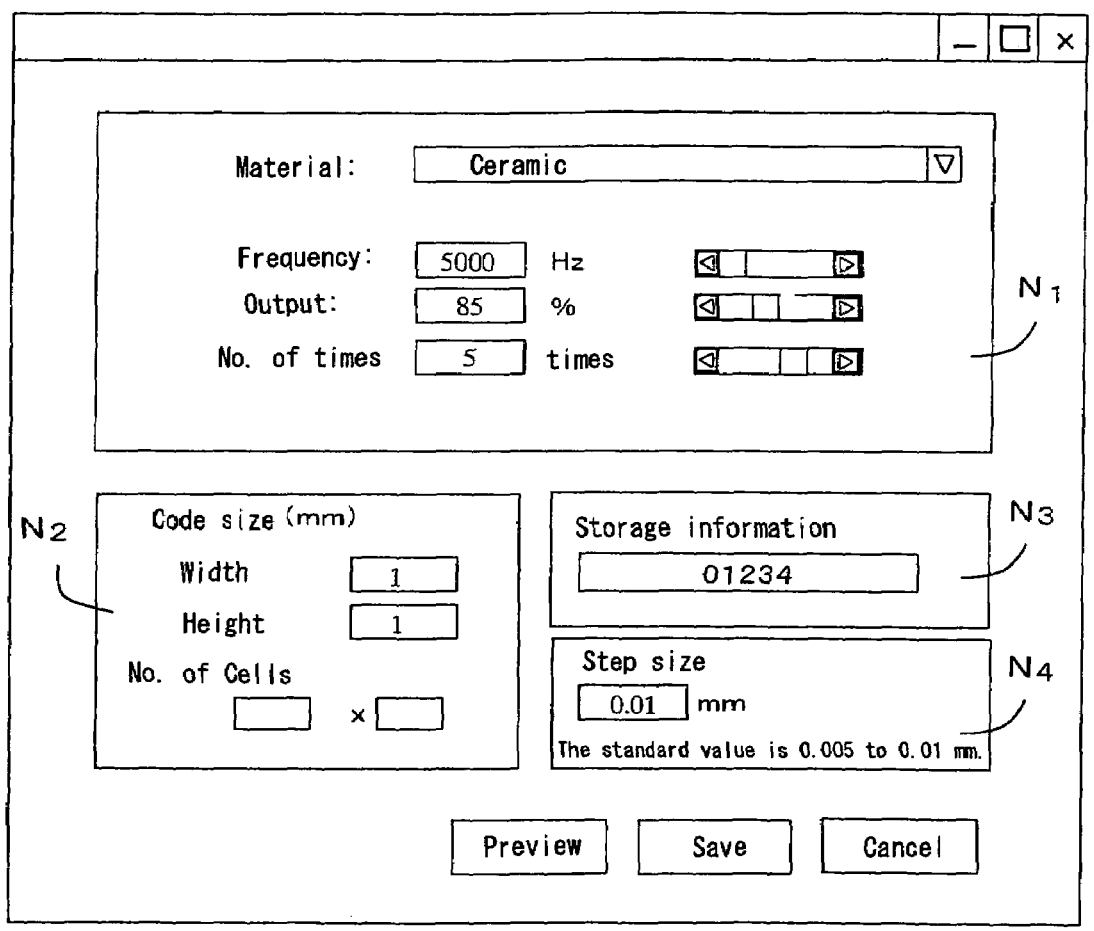

The input of settings for generating the 2-dimensional code of this embodiment was explained here. FIG. 14 and FIG. 15 show a flowchart of the processing by the CPU 11 when inputting settings. When inputting settings, an input screen as shown in FIG. 16 is displayed on the display 13 of the data-control device 10. On the input screen, there is: an information-input section N1 for input related to the material to be marked; an information-input section N2 for information related to the code size and number of cells; an information-input section N3 for information related to storage information; and an information-input section N4 for information related to the step size; and information is input in the respective section. A suitable value for the step size is displayed in the information-input section N4 according to the material to be marked and conditions when performing laser marking. In the case of laser marking in which dots having a diameter of 0.003 mm are formed on a metallic surface, for example, suitable values of 0.005 mm to 0.01 mm for ceramic, 0.01 mm to 0.02 mm for resin or plastic, 0.01 mm to 0.02 mm for painted surfaces, 0.003 mm to 0.01 mm for aluminum, 0.003 mm to 0.01 mm for stainless steel, 0.006 mm to 0.02 mm for glass, and 0.006 mm to 0.02 mm for paper are presented. By referencing these suitable values, the user inputs the step size.

In the case where the marking material is ceramic and it is desired to increase the dot density to make a dense marking, a step size of 0.005 mm is specified, and when it is desired to decrease the dot density to make a thin marking, a step size of 0.01 mm is specified. The step size is not limited to the suitable range, and values outside this range can also be specified. For example, when the step size is zero, laser marking will be performed with 1 dot per cell as shown in FIG. 11C.

Materials to be marked include ceramic, resin or plastic, painted surfaces, aluminum, silicon, glass, stainless steel, paper, wood, leather, cloth, jewelry, etc. First, in step S1, the CPU 11 determines whether or not one of the specified materials has been selected. After it has been determined that a specified material has been selected (step S1: Yes), the CPU 11 reads the conditions from the parameter information stored in the memory unit 16 for performing laser marking (step S2). When it is determined that a specified material has not been selected (step S1: No), this process continues until a specified material has been selected.

Next, in step S3, the CPU 11 determines whether or not the code size has been specified. In order to specify the code size, the user inputs values for the width and height in the information-input section N2 for information related to code size on the display screen shown in FIG. 16. When the code size has been specified (step S3: Yes), the input data is received by the data-control device 10, and together with being stored in the memory unit 16, it is recognized by the CPU 11 (step S4). When the code size is not specified (step S3: No), the process is repeated until it is specified.

Furthermore, in step S5, the CPU 11 determines whether or not the information to write into the 2-dimensional code has been input. When the storage information has been input (step S5: Yes), the input data is received by the data-control device 10, and together with being stored in the memory unit 16, it is recognized by the CPU 11 (step S6).

Next, in step S7, the CPU 11 determines whether or not the number of cells has been specified. When the number of cells has been specified (step S7: Yes), the input data is received by the data-control device 10, and together with being stored in the memory unit 16, it is recognized by the CPU 11 (step S8). When the number of cells has not been specified (step S7: No), the CPU 11 advances to step S9.

In step S9, the CPU 11 calculates the size of the cells of the 2-dimensional code. When the number of cells was specified in step S7, the CPU 11 calculates the cell size based on the code size and the number of cells. When the number of cell was not specified in step S7, the CPU 11 calculates the cell size based on the code size and the storage information.

Next, in step S10, the CPU 11 determines whether or not the step size has been specified (step S10). When the step size is specified (step S10: Yes), the input data is received by the data-control device 10, and together with being stored in the memory unit 16, it is recognized by the CPU 11 (step S11). When the step size is not specified (step S10: No), the CPU 11 determines that the 2-dimensional code is to be formed using standard density, and sets the step size to an intermediate value within the suitable range, then advances to step S12.

In step S12, the CPU 11 creates laser-marking information according to the code size, storage information, cell size and step size in order for the laser marker 40 to perform laser marking.

Figure 17:
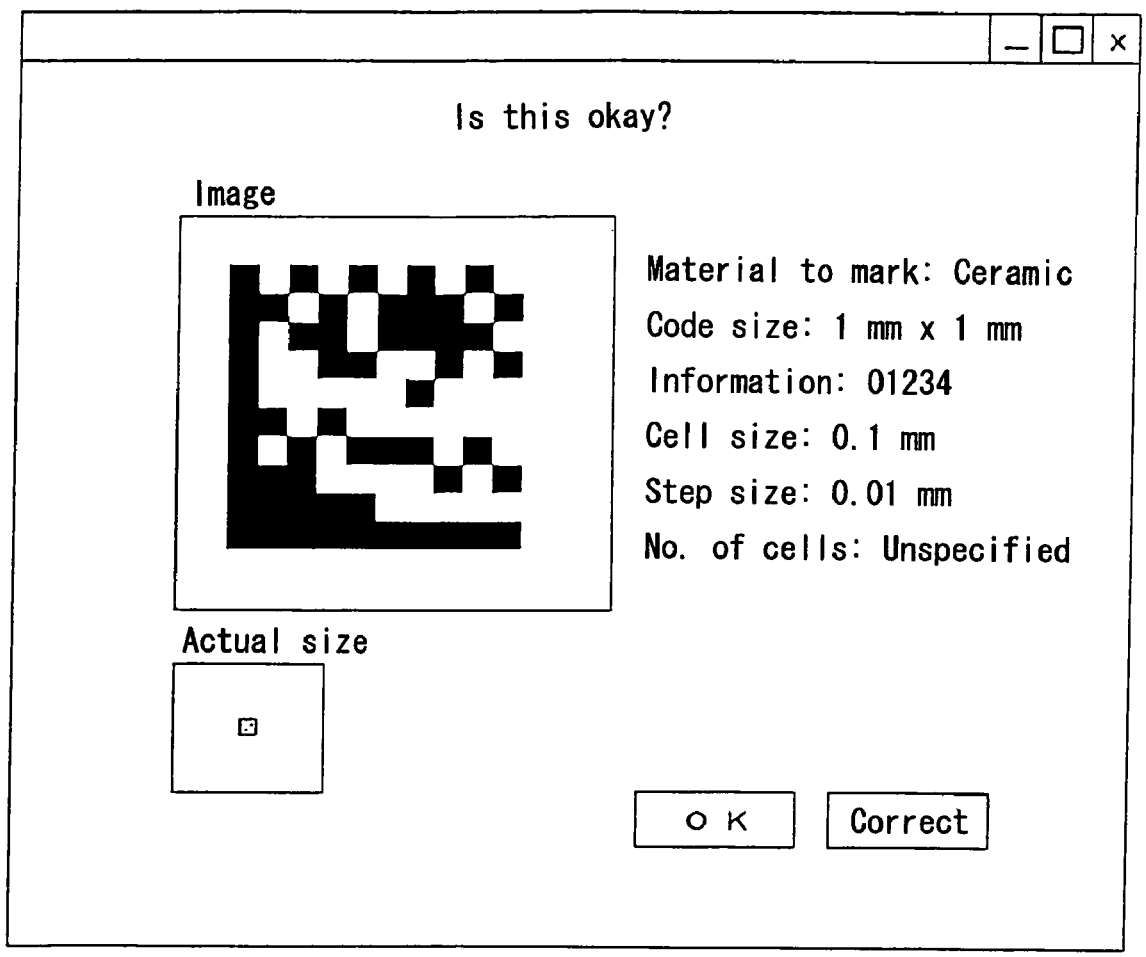
FIG. 17 is a drawing that shows an example of a confirmation screen for confirming created 2-dimensional code.
Figure 18:
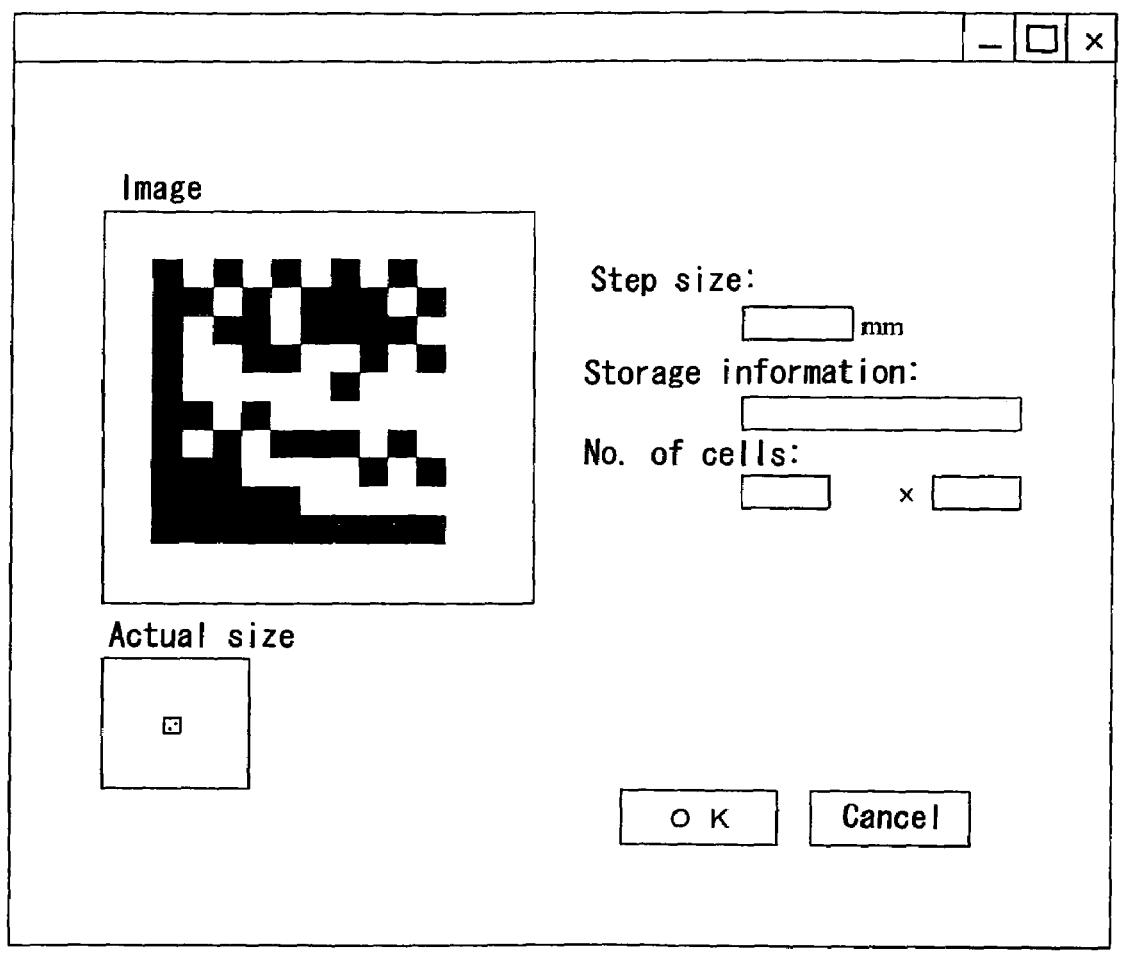
FIG. 18 is a drawing that shows an example of a correction-information-input screen for created 2-dimensional code.

In step S13, the 2-dimensional code that was set in the process described above is displayed on the display 13 of the data-control device 10. At that time, a screen as shown in FIG. 17 is displayed on the display 13. This kind of display on the display 13 can be performed automatically at the instant that setting ends, or can be displayed only when there is a preview request from the user. The user looks at the display 13 and checks whether or not the 2-dimensional code is okay. In step S14 the user determines whether or not it is necessary to correct the storage information or step size. When there are no corrections, the user clicks on the OK button (step S14: No), and the CPU 14 advances to step S20. When there is a correction request from the user (step S14: Yes) and correction information is input for the storage information or step size, that correction information is recognized by the data-control device 10 and displayed on a correction screen as shown in FIG. 18 (step S15).

On the correction screen, correction information for the storage information or step size is input. After the correction information has been input, that information is received by the data-control device 10, and together with being stored in the memory unit 16, it is recognized by the CPU 11 (step S16).

On the correction screen, it is preferable that each time the user performs a change instruction and the displayed 2-dimensional code is changed, that the correction process be possible while the user checks the status of the 2-dimensional code.

Also, the CPU 11 performs the correction process (step S17) and determines whether or not correction is complete (step S18). When correction is not complete (step S18: No), the CPU 11 repeats the process from step S15 to step S17. When the CPU 11 determines that correction is complete (step S18: Yes), it then corrects the laser-marking information in step S19 based on the changed storage information and step size. Also, in step S20, the CPU 11 sends the laser-marking information to the laser marker 40. The controller 42 of the laser marker 40 controls the ultrasonic Q switch element 43, internal shutter 44, external shutter 45, attenuator 46 and galvanometer mirror 47, and forms the specified 2-dimensional code on the material to be marked by laser marking. When performing laser marking, marking is performed in the order shown in FIG. 19A. Also, marking in each cell is performed by dot marking in the direction shown in FIG. 19B.

In this way, with the 2-dimensional code formation method of this invention, when the number of cells for a specified code size is 10×10, for example, it is possible to store 6 characters of numeric characters or 3 characters of alphanumeric characters, and 1 character in the case of binary. Also, even when the code size is the same and the number of cells is 144×144, it is possible to store a large amount of information such as 3,116 characters of numeric text, or 2,335 characters of alphanumeric text, or in the case of binary, 1,556 characters. Therefore, even in locations where the space for marking is limited, it is possible to write a lot of information in a small space. Also, of the unit cells, the cells that will become black cells are formed by dot marking, so by adjusting the distance between dots, which is the step size, it is possible to handle cells of any size. Moreover, by adjusting the step size it is possible to form 2-dimensional code having a desired density.

Also, in this embodiment, the 2-dimensional code is formed in a good state by laser marking directly onto the material to be marked. Therefore, compared with applying printed 2-dimensional code onto a different material, or forming it by printing, it is possible to maintain the information over a long period of time without pealing or fading.

Moreover, since marking is dot marking, it is possible to affix 2-dimensional code to any material when performing laser marking better than in the case of vector marking, in which laser marking of the material to be marked is performed continuously; and the marking has good resistance to weather, corrosion and impact without continuous minute scratches or the like in the area of marking. Particularly, when performing laser marking on a transparent material such as glass, marking is performed well without the cracking that occurs when marking the transparent material being contained in the dots, and without cracking occurring outside the range of the 2-dimensional code that is formed by dot marking. When marking a metallic material, by making the depth of the dots between 1 µm and 20 µm, and when marking a painted surface, by making the depth of the dots between 1 µm and 10 µm, marking is performed well, and it is possible to prevent degradation of the marked material.

In the embodiment described above, a method of specifying the step size in order to set the dot density was explained, however, instead of the step size, a method of specifying the number of dots is also possible. The step size and number of dots have a correlative relationship, and by setting one, the other is also set.

Furthermore, in the embodiment described above, when changing the cell size in accordance to the amount of information, an example was given of handling the change by changing the step size of the dots within a unit cell. In the case where instead of dot marking, vector marking in which n vertical straight lines and m horizontal straight lines are marked, it is possible to adjust the size of the cells by changing the length of the straight lines, or by changing the number of straight lines.

Next, the construction for using the aforementioned 2-dimensional code to perform traceability management of a product will be explained.

Figure 20:
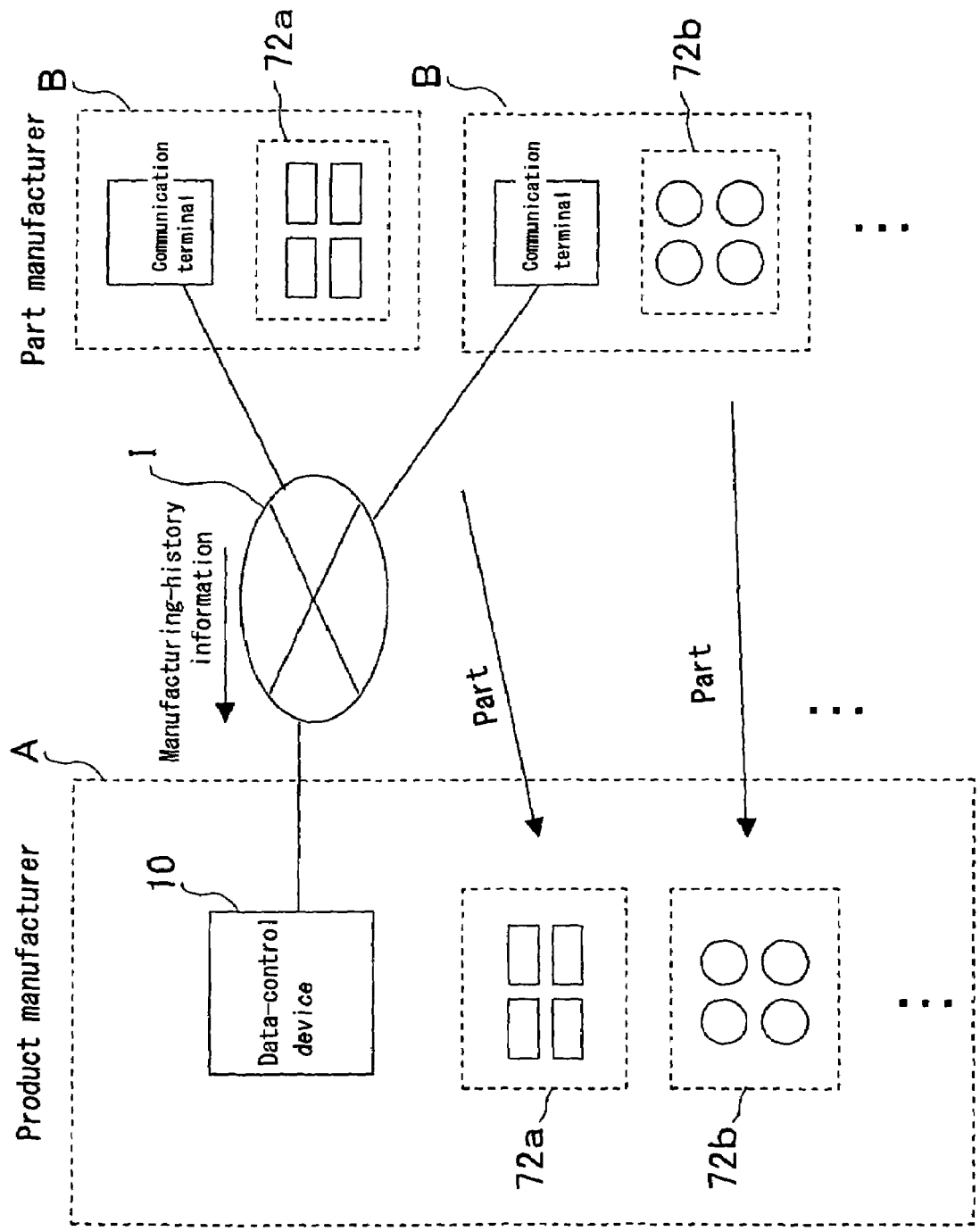
FIGS. 20 is a drawing showing the flow of manufacturing-history information and parts of this invention.

In this embodiment, an electrical device 70 will be explained as the product. The product in this invention it taken to be all products including electronic or electrical devices, machinery, automobiles, housing material and parts that include these in which one or a plurality of parts are assembled. The electrical device 70 is constructed by assembling a plurality of parts 72 (72a, 72b . . . ). As shown in FIG. 20, parts that are ordered by product manufacturer A are delivered to product manufacturer A from the respective product manufacturers B.

Also, after the parts 72 have been delivered to the product manufacturer A, manufacturing-history information for parts 72 is sent to product manufacturer A from the respective product manufacturers B over a communication network I such as the Internet. This manufacturing-history information can be identified by delivery numbers or the like that are attached to the respective delivered parts 72.

At the product manufacturer A, a data-control device 10 receives the manufacturing-history information, and the received manufacturing-history information is correlated with the respective parts 72 by the delivery numbers or the like, and identified. The manufacturing-history information includes information such as the manufacturing date, manufacturing line number, product number, manufacturing supervisor's number, lot number of parts used, inspection results, shipping tray number, details about the material, manufacturing conditions, etc.

Also, the parts 72 are divided according to ID numbers, and the manufacturing-history information that was identified according to the delivery number is stored in a database 16c inside the data-control device 10 (described later) based on ID numbers. When doing this, the part manufacturer's code, part code, delivery number, etc, are added in the database 16c. In other words, even for identical parts 72, different ID numbers are given to parts having different manufacturing dates and manufacturing-line numbers, and parts 72 having identical ID numbers are considered to be identical parts. Therefore, by identifying the ID number, it is possible to access the manufacturing-history information in the database 16c for that part 72.

In this embodiment, the manufacturing-history information is received by the data-control device 10 via the communication network I and stored in the database 16c, however, the invention is not limited to this, and it is possible to manually input data in the database 16c such as the part number that is affixed to the container package in which a delivered part is stored, or to read information contained in a barcode, 2-dimensional code, or IC tag that is affixed to a container package by a reader or the like, and store that information in the database 16c, or to receive an electronic medium from a parts manufacturer B on which manufacturing-history information is stored, and then input that information in the database 16c.

Figure 21:
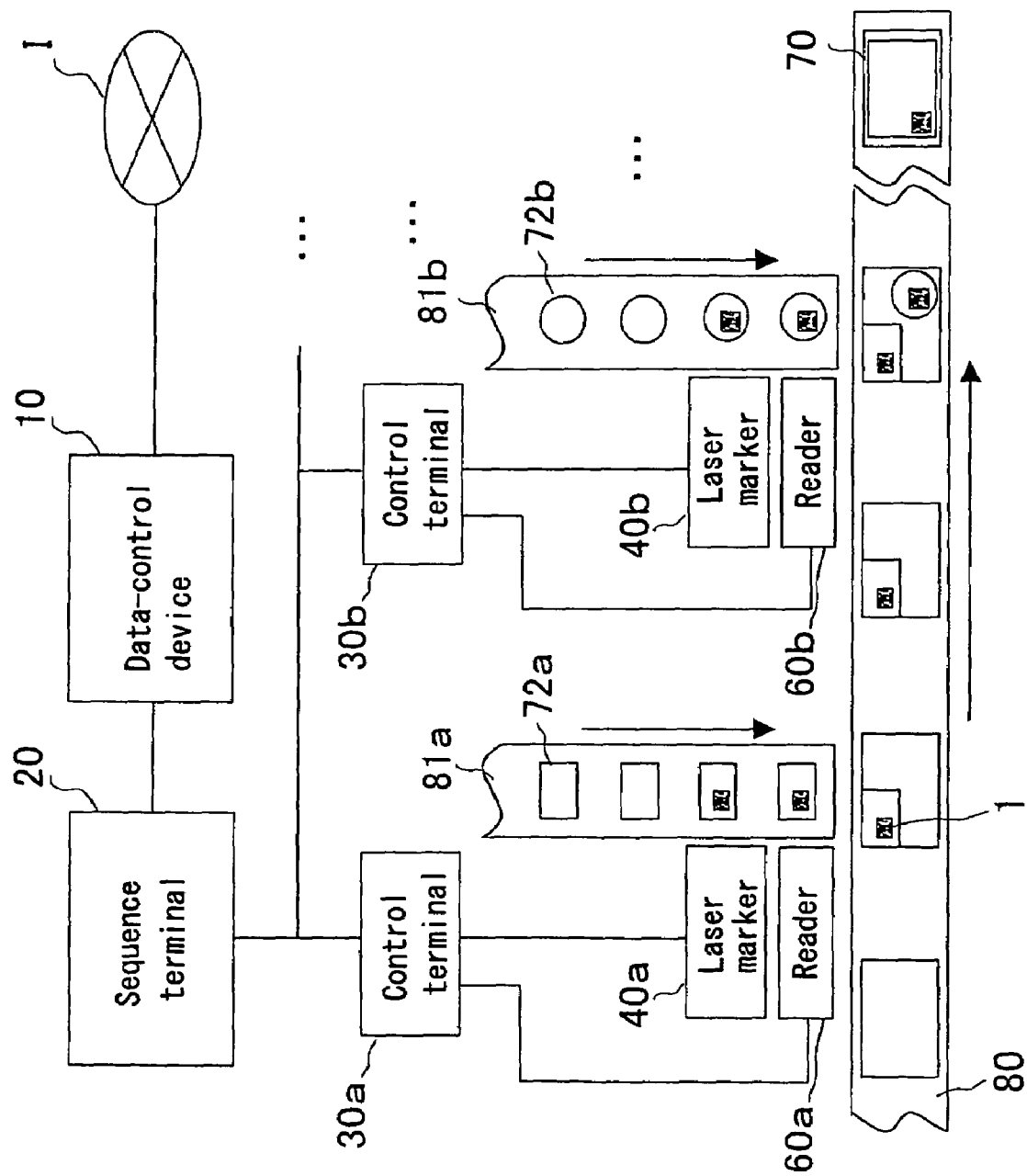
FIG. 21 is a drawing for explaining the traceability management system of this invention.
Figure 2:
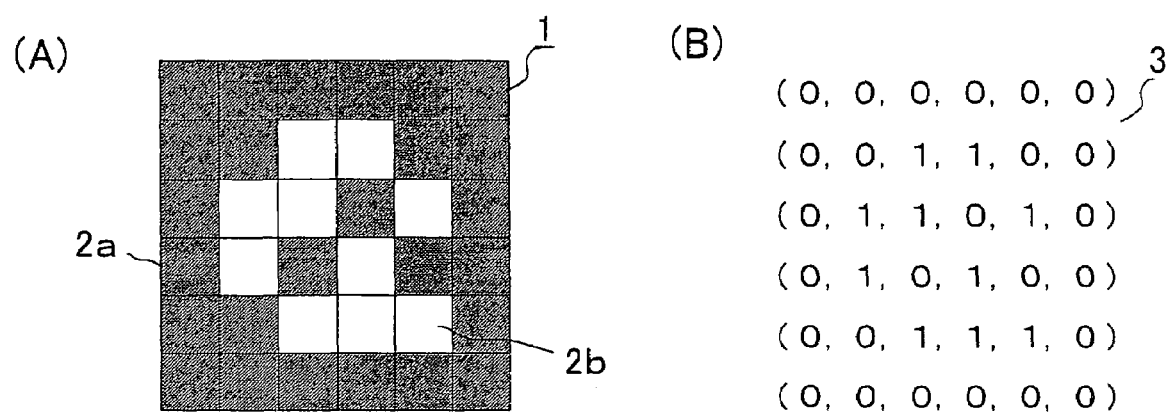
Figure 2:
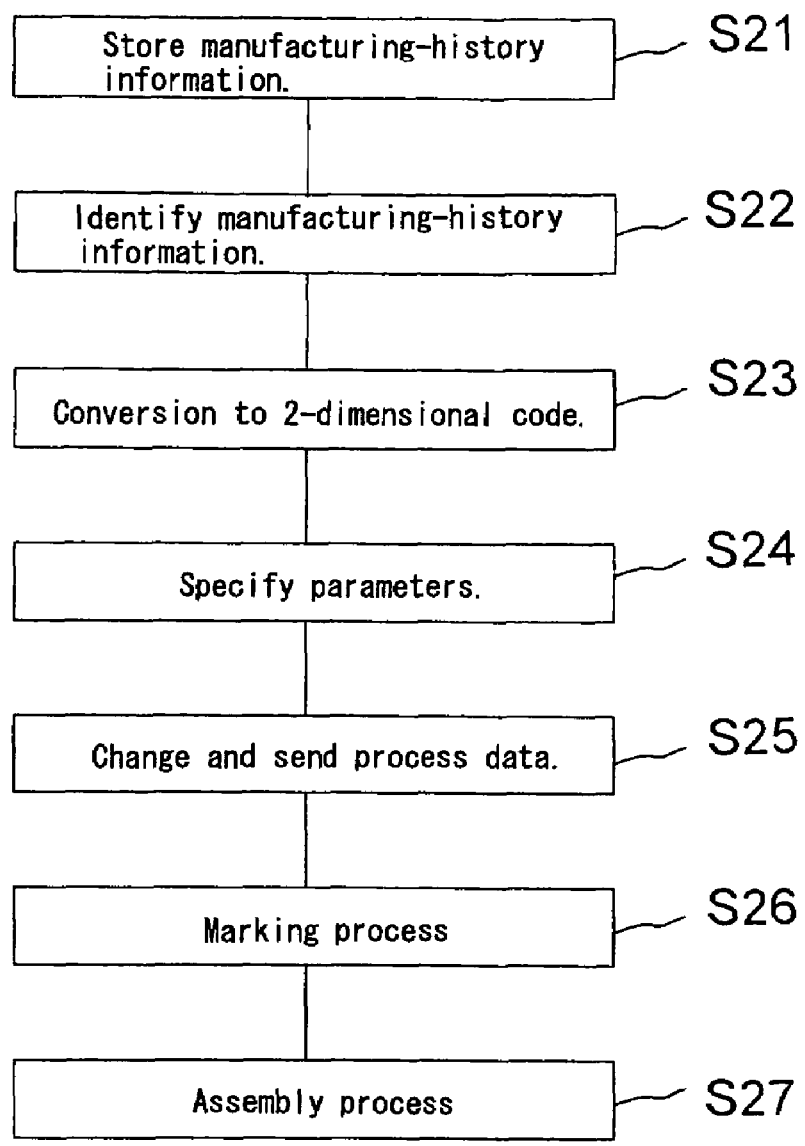

The construction of the traceability-management system S (hereafter referred to as the system S) of this embodiment will be explained. As shown in FIG. 21, this system S comprises: a data-control device 10 that is connected to a communication network I, a sequence terminal 20 that controls the sequence of laser marking that is performed on a plurality of conveyor lines 81 (81a, 81b . . . ), control terminals 30 (30a, 30b . . . ) that are located on each conveyor line 81, laser markers 40 (40a, 40b . . . ) that are controlled by the control terminals 30, and readers 60 (60a, 60b . . . ) that read 2-dimensional code that has been marked by the laser markers 40.

The electrical device 70 is manufactured by assembling in order the parts 72 that are conveyed on the conveyor lines 81 (81a, 81b . . . ) with the work that is conveyed on the main conveyor line 80 by a robot arm or the like (not shown in the figure), and then performing inspection. In the embodiment described below, an example is explained in which the product is an electrical device 70 that is constructed using a plurality of parts, however, this invention can just as well be applied to a product or part that is constructed using a single part or material.

The parts 72 are conveyed in order on the conveyor lines 81. Laser markers 40 are located on each conveyor line 81 for marking 2-dimensional code 1 on each of the conveyed parts 72. The laser markers 40 mark in order a specified location on the parts 72 that are conveyed on the conveyor lines 81 with 2-dimensional code 1 that includes an ID number for accessing the manufacturing-history information.

Also, there is a reader 60 located down line from the laser marker 40 on each of the conveyor lines 81. According to a control signal from the control terminal 30, this reader 60 reads the 2-dimensional code 1 that was marked by the laser marker 40, and sends the read 2-dimensional code 1 to the control terminal 30. The control terminal 30 checks whether the 2-dimensional code 1 that was sent from the reader 60 matches the 2-dimensional code 1 that was marked by the laser marker 40. When it is determined from the check results that they do not match, the part 72 that was marked with that 2-dimensional code 1 is removed from the conveyor line 81 by a robot arm (not shown in the figure).

The sequence terminal 20 of this embodiment controls the sequence of laser marking that is performed on a plurality of conveyor lines 81, however, construction is also possible in which this function is performed by the data-control device 10.

The 2-dimensional code 1 of this embodiment is formed using dot marking by the laser marker 40, so it is possible to form 2-dimensional code 1 with good precision on parts 72 having extremely small dimensions, as well as parts 72 having very large dimensions. Also, since a laser marking method is used, it is possible to perform marking directly on the product or parts.

In the conventional method it was not possible to affix information or the like that was related to an ID number, details about the material, manufacturing conditions, etc., to very small parts, however, with this invention, it is possible to mark even very small parts with 2-dimensional code that includes an ID number. Therefore, it becomes possible to manage the traceability of almost all of the parts 72 of the electrical device 70.

Moreover, in this invention, laser marking is performed directly on the parts 72, so when compared with adhering printed 2-dimensional code 1, or directly printing 2-dimensional code 1 on the parts 72, problems such as the printed code pealing or the printed area fading over time does not occur, so is preferable. Also, since marking is performed be a laser beam, there is no need for consumable products such as in the case of adhering printed material or the like, which is also preferable.

Next, FIG. 23 will be used to explain the operating process of this system. First, in the process of acquiring manufacturing-history information, the manufacturing-history information for parts 72 that is obtained over the communication network I is stored in the database 16c (S21). Then, using the input unit 12, the operator specifies an ID number for each conveyor line 81 for identifying the manufacturing-history information for each of the respective conveyed parts 72 (S22). Identifying the manufacturing-history information corresponding to the conveyed parts 72 is performed using a delivery number, etc.

In the process of creating 2-dimensional code, the data-control device 10 converts the ID numbers specified for each of the conveyor lines 81, and forms 2-dimensional code 1, then as shown in FIG. 22A, correlates the unit cells for the black cells 2a and white cells 2b of the light-dark pattern of the 2-dimensional code 1 with 0 and 1, respectively, and as shown in FIG. 22B, forms 2-dimensional matrix data 3 having 1 bit per cell (S23).

Next, in the process for setting parameters, the operator uses the input unit 12, and taking into consideration the size of the marking area on the parts 72, inputs and sets the size of the 2-dimensional code 1, then based on the size of the 2-dimensional code 1, and in addition to size information such as the size of one cell as shown in FIG. 25, the processing diameter for the beam spot and the number of beam spots in one cell that is suitable for the material being processed, specifies optimal values for the laser power, Q switch frequency, dot-irradiation time, number of irradiations, laser wavelength, and the like based on the parameter information 16*d* (S24).

In other words, since the reaction values of the laser differ according to the material being marked, the diameters of the dots 5 being formed differ even when irradiated with a beam spot having the same diameter and same output, so the processing diameter of the beam spot is set beforehand according to type of material being processed and the size of the dots 5 being formed, and based on that, the number of vertical and horizontal (n, m) dots 5 arranged in 1 cell, and the distance between dots 5 are set. That is, when marking 2-dimensional code 1 that includes identical data (as will be described below), it is possible to suitably set the size of the 2-dimensional code 1 according to the size of marking area on the parts 72.

Next, the aforementioned size information for 1 cell is combined with the 2-dimensional matrix data 3 having 1 bit per cell, and in the order of scanning, is converted to process data in which the beam-spot coordinates are saved. The process up to this point is performed by the data-control device 10, and it sends the converted process data and a control signal to the sequence terminal 20 (S25). At this time, all of the coordinate data for the dots 5 formed by beam irradiation are identified.

Figure 24:
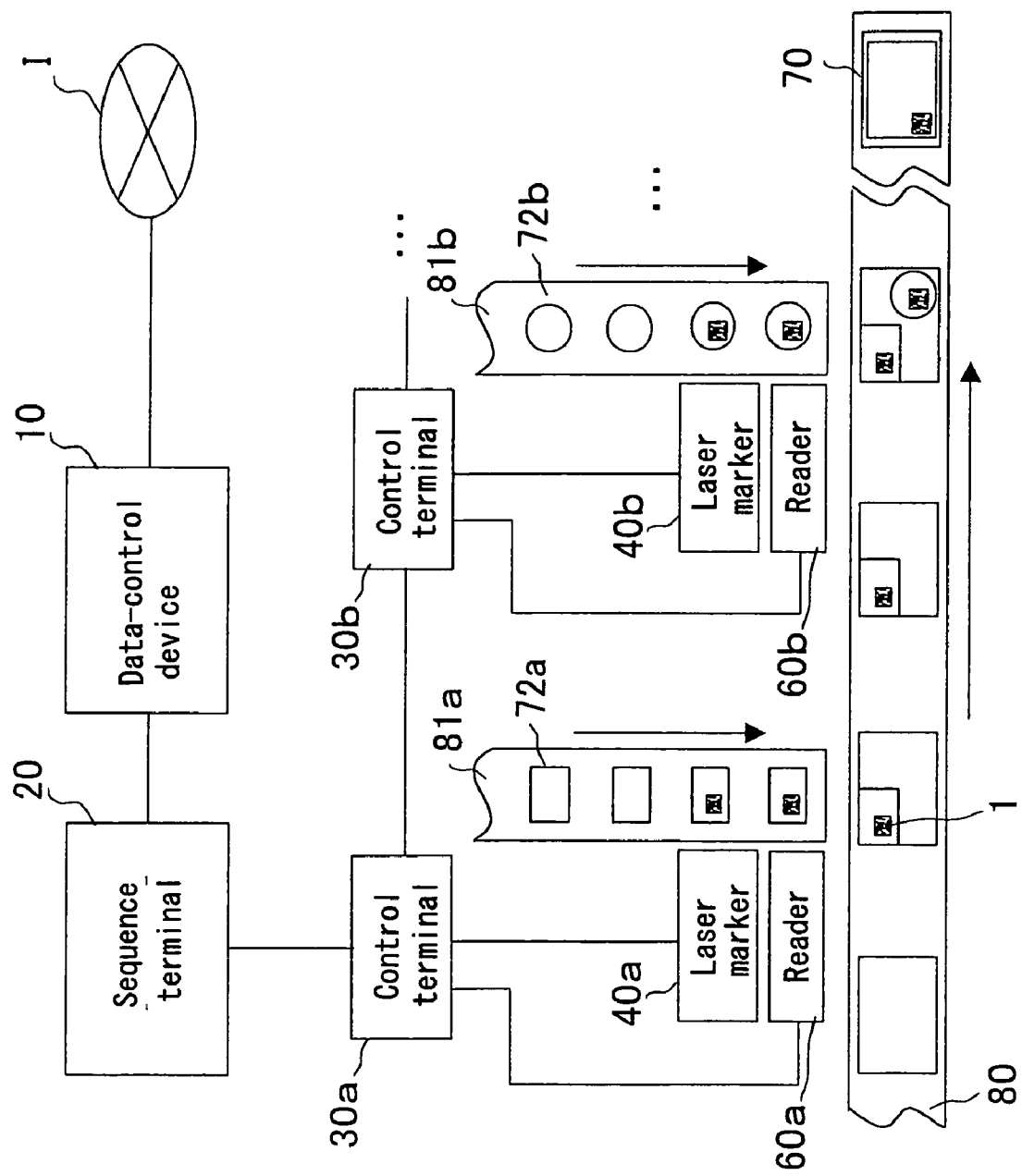
FIG. 24 is a drawing for explaining another traceability management system of this invention.
Figure 2:
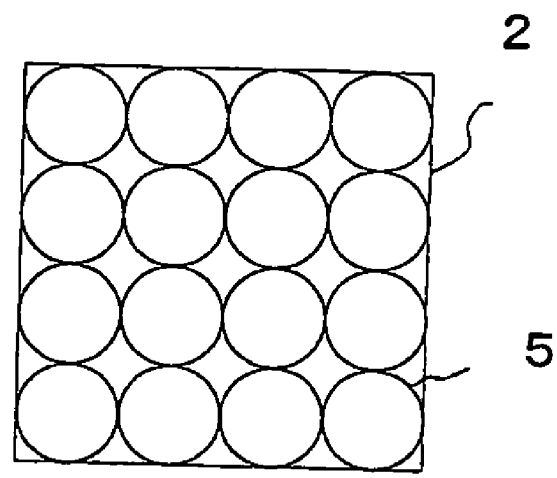

Also, in the marking process (S26), the sequence terminal 20 creates a sequence for the processing order of process data. In other words, the sequence is set so that the process data is transferred to the control terminals 30*a*, 30*b* in parallel as shown in FIG. 21, and marking is performed at the same time, or so that the process data is transferred in series as shown in FIG. 24, and sent to the control terminal 30*b* that is waiting for processing. That is, with the construction shown in FIG. 21, the control terminals 30 are directly connected to the sequence terminal 20, and each control terminal 30 performs marking control in parallel at the same time. On the other hand, with the construction shown in FIG. 24, the control terminals 30 are connected in series, and laser marking is performed by the laser marker 40 at specified time intervals.

Figure 26:
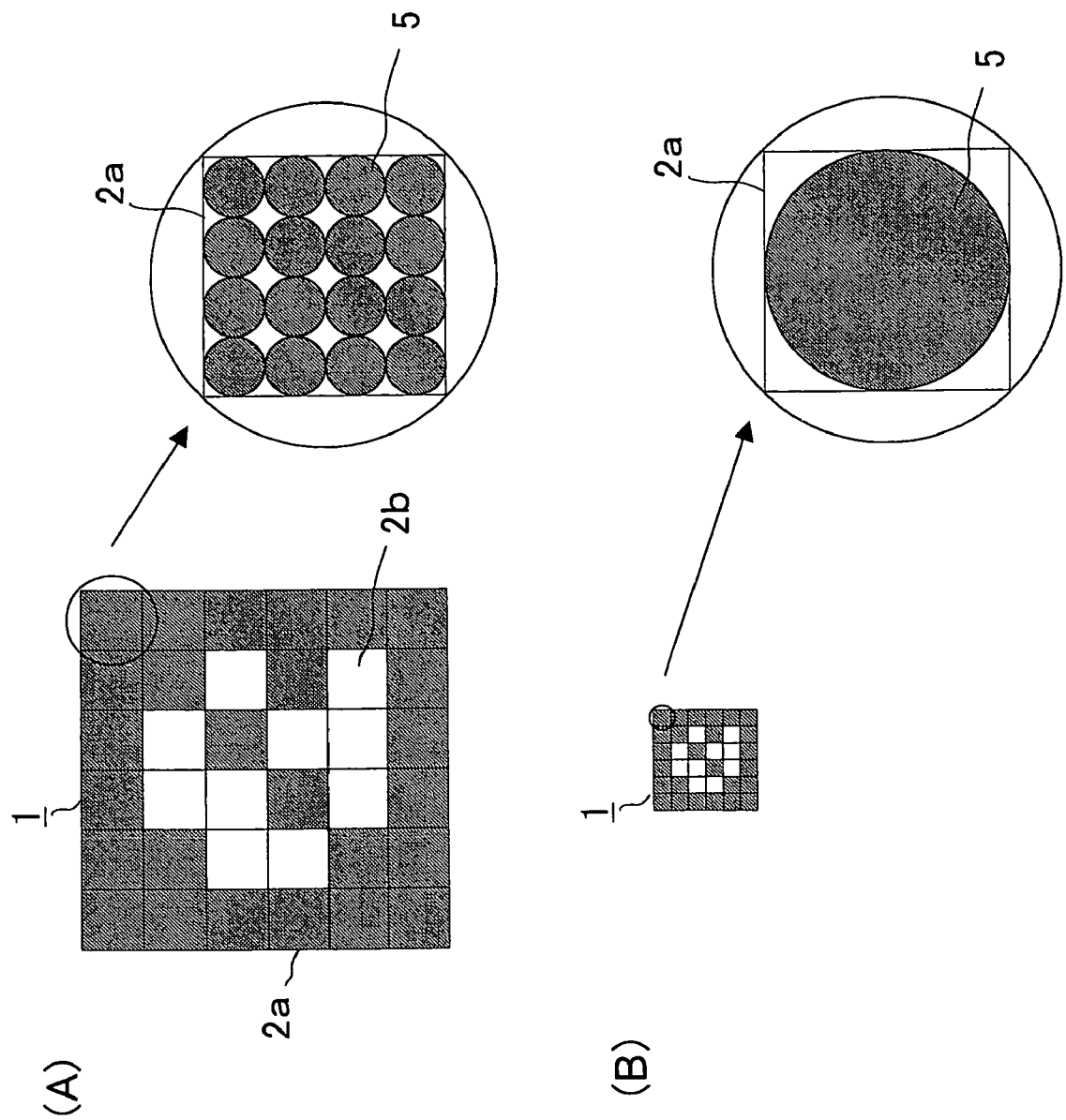
FIGS. 26A and 26B are drawings for explaining the 2-dimensional code of this invention.

After the process data, in which the beam spot coordinates are saved in the order of scanning, is transferred to the control terminals 30*a*, 30*b* . . . in parallel in this way, the laser markers 40*a*, 40*b* . . . irradiate laser beams on the display surfaces of the respective materials, and arrange the dots 5 vertically and horizontally as shown in FIG. 26A to form black cells 2*a*, and areas that are not irradiated by the laser beam become white cells 2*b*, to form 2-dimensional code 1. The size of the cells 2 are regulated, and dots 5 are arranged along the outer edges of the cells 2, with the number of dots arranged inside the cells also being regulated, so it is possible to construct accurate black cells 2*a*.

The 2-dimensional code 1 that is laser marked in this way is read by a reader 60 that is located down line from the laser marker 40, and the 2-dimensional code 1 that is read is sent to the control terminal 30. The control terminal 30 checks whether or not the 2-dimensional code 1 has been properly marked. In other words, the control terminal 30 checks whether or not the 2-dimensional code 1 that is sent from the reader 60 matches the 2-dimensional code 1 that is marked by the laser marker 40. When it is determined that they match, that part 72 is assembled in the work on the conveyor line 80 in the manufacturing process (S26), however, when it is determined that they do not match, that part 72 is removed from the conveyor line 81 by a robot arm or the like (not shown in the figure).

FIG. 26A shows an example of 2-dimensional code 1 in which dots 5 are arranged 4×4 in one cell. On the other hand, FIG. 26B shows an example of the same 2-dimensional code 1 in which only one dot is set in one cell. In FIG. 26B, the dots 5 have the same processing diameter as in FIG. 26A. In other words, the vertical and horizontal length of the 2-dimensional code 1 in FIG. 26B is ¼ the vertical and horizontal length of the 2-dimensional code 1 in FIG. 26A. In this way, it is possible to express the same information using 2-dimensional code 1 having different sizes.

Also, by accurately controlling the beam-spot coordinates, it is possible to perform marking of 2-dimensional code 1 with highly precise dot 5 placement, so even when 2-dimensional code 1 having a very minute size is set, it is possible to maintain high reading precision.

In the embodiment described above, the data converted to 2-dimensional code was an ID number for a part 72, however, the invention is not limited to this, and in the case of large parts or the like for which a large marking area can be maintained, it is possible to convert and mark the manufacturing-history information itself as 2-dimensional code. In that case, by reading the 2-dimensional code 1 that is attached to a part that is identified as a defective part, it is possible to immediately know the manufacturing-history information, and thus making it possible to quickly respond to inquiries or claims regarding the product quality. Also, it is possible to perform laser marking of 2-dimensional code 1 of most all of the parts 72 of the electrical device 70, or to perform laser marking of 2-dimensional code 1 for just the major parts.

As was described above, laser marking 2-dimensional code 1 that expresses an ID number is performed directly on the parts 72 of the electrical device 70, so when trouble occurs, by identifying the part 72 that is the cause of the trouble, it is possible immediately and surely access manufacturing-history information stored in the database 16*c* based on the 2-dimensional code 1 attached to that part 72.

In this way, it is possible to know the date of manufacture, the manufacturing line number, product number, number of the manufacturing supervisor, lot number of the part used, inspection results, shipment tray number, and the like of the part 72 that is the cause of the trouble; thus making it possible to quickly trace the origin, distribution route, manufacturing process, and the like of that part 72. Also, by finding the reason that caused the part to be defective, in the next manufacturing process it is possible to adjust, repair or improve the trouble in the manufacturing equipment to eliminate defective parts, thus making it possible to lower the overall cost for manufacturing the electrical device 70. Moreover, it is possible to lower the cost for handling claims and performing customer service.

Also, since it is possible to attach minute 2-dimensional code 1 to the parts 72 by laser marking, it is possible to mark most all of the parts 72, from very small-sized parts 72 to very large-sized parts, with 2-dimensional code 1. This makes it possible to immediately obtain manufacturing-history information even for extremely small parts 72 that were difficult to trace quickly with the prior art.

Figure 27:
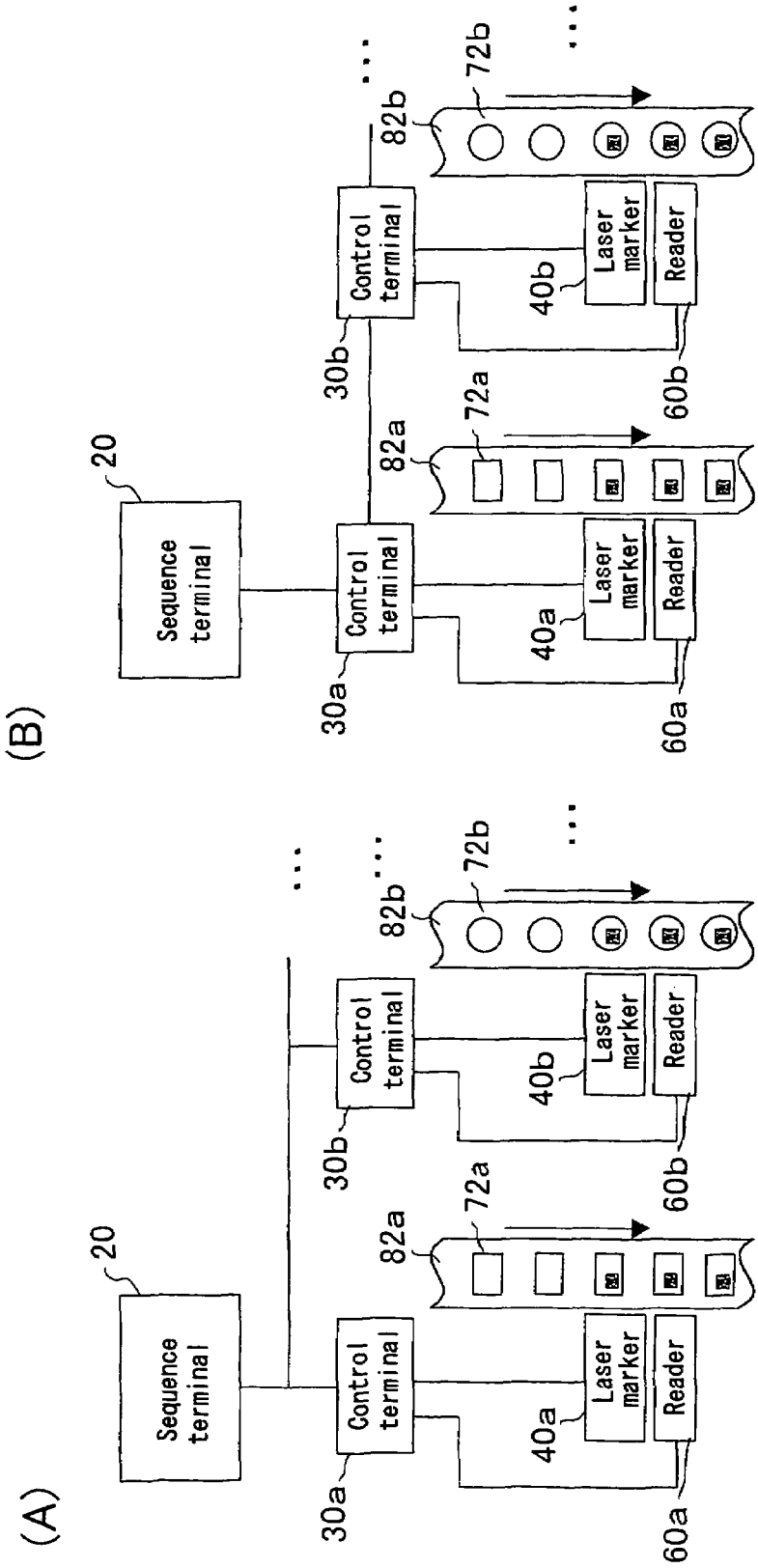
FIGS. 27A and 27B are drawings for explaining another traceability management system of this invention.

Moreover, in the embodiment described above, a laser marker 40 and reader 60 were located on each conveyor line 81 that supplies parts 72 to the main conveyor line 80, however, the invention is not limited to this, and as shown in FIG. 27, construction is also possible in which a laser marker 40 and reader 60 are located on a special conveyor line 82 for marking.

In this case, parts 72 that are delivered from parts manufacturers B are placed on the conveyor line 82, and the laser marker 40 marks them with 2-dimensional code 1 that is sent from the data-control device 10 via the sequence terminal 20. Also, the reader 60 reads the laser marked 2-dimensional code 1, and the control terminal 30 determines whether or not marking was performed correctly. The connection between the sequence terminal 20 and each of the control terminals 30 can be such that they are connected in parallel as shown in FIG. 27A, or can be such that they are connected in series as shown in FIG. 27B.

INDUSTRIAL APPLICABILITY

With the invention described above, it is possible to form 2-dimensional code having a specified code size using simple device construction regardless of the amount of information such as text or images that are written in the code. Therefore, it is possible to attach 2-dimensional code having a size suitable to the object being marked.

Also, when cell size is changed, it is possible to store different amounts of information in 2-dimensional code having the same size, so it becomes possible to attach 2-dimensional code having the desired information without being limited by the surface area of the location to be marked.

Furthermore, when the code size and number of cells are specified, it is possible to form 2-dimensional code having the specified code size and number of cells and to improve the reading precision regardless of the amount of information.

With this invention, laser marking is performed using dots, so marking errors such as protruding out from the left or right of the marking area, or creation of blank areas are prevented, and thus it is possible to create high-quality 2-dimensional code. Also, since laser marking is performed using dots, by having one dot per cell, for example, it is possible to form extremely minute 2-dimensional code, and thus it is possible to attach 2-dimensional code to even very small electronic parts.

Moreover, since laser marking is performed using dots, by specifying the step size or number of dots, it is possible to create 2-dimensional code having a desired density. Furthermore, since laser marking is performed using dots, it is possible to reduce the effect of marking on the material more than in vector marking, in which laser marking of the material being marked is performed continuously, and thus it is possible to obtain finished marking that has excellent resistance to weather, corrosion and impact.

Also, in this invention, using laser marking, it is possible to directly mark 2-dimensional code, which includes an ID number that makes it possible access manufacturing-history information, or 2-dimensional code that includes a large amount of information (manufacturing-history information) such as material and manufacturing conditions, finished product quality, etc. on individual parts of a product. Since the size and amount of space available for marking varies for each individual part, the size of the 2-dimensional code is set to correspond to them. This makes it possible to perform laser marking of 2-dimensional code on all of the parts, from very small-sized parts to very large-sized parts.

Therefore, when a defective part is the cause of trouble with a product, by reading the 2-dimensional code that is attached to the part, it is possible to immediately access the manufacturing-history information for that part. This makes it possible to greatly shorten the tracing time for accessing the manufacturing-history information, and makes it possible to access that manufacturing-history information. Also, by reflecting the manufacturing-history information for a part that was obtained in this way in the manufacturing process of the product, it is possible to effectively avoid manufacturing a defective product. Moreover, when marking 2-dimensional code that includes a large amount of information such as material and manufacturing conditions, finished product quality, etc., it is possible to know the manufacturing-history information by directly reading the 2-dimensional code without having to access manufacturing-history information that is stored separately, and thus it is possible to quickly respond to inquiries, claims or the like regarding product quality.

What is claimed is:

1. A 2-dimensional code formation method comprising:
    a step of specifying a fixed code size for a 2-dimensional code regardless of an amount of storage information to be written in said 2-dimensional code;
    a step of specifying storage information to be written in said 2-dimensional code;
    a step of calculating cell size for a unit cell of said 2-dimensional code providing storage of said storage information in said 2-dimensional code having said specified code size;
    a step of specifying the dot step size or number of dots n×m (where n and m are natural numbers) to be arranged vertically and horizontally inside said unit cell;
    a step of creating laser-marking information for forming said 2-dimensional code having said specified code size, based on said code size, said storage information, said cell size and said dot step size or number of dots, wherein said laser-marking information includes at least dot coordinate information; and
    a step of laser marking said 2-dimensional code having said specified code size by laser dot marking to uniformly arrange dots vertically and horizontally in an n×m matrix array inside said unit cell based on said dot coordinate information of said laser-marking information by irradiating a laser beam directly on a material to be marked, wherein said dots are beam spots generated by irradiating a laser beam.

2. The 2-dimensional code formation method of claim 1 wherein the cell size of said unit cell is calculated by divided said specified code size by the number of code obtained by encoding said storage information into said 2-dimensional code.

3. The 2-dimensional code formation method of claim 1, further comprising:
    specifying a number of said unit cells; and
    wherein the cell size of said unit cell is calculated by dividing said specified code size by said specified number of said unit cells.

4. A 2-dimensional code formation method for forming a 2-dimensional code on a product including a single part or a plurality of parts, and comprising:
    a manufacturing-history-information-acquisition step of acquiring manufacturing-history information for said part;
    a 2-dimensional-code-conversion step of converting data that includes an ID number for identifying manufacturing-history information or includes the manufacturing-history information itself for said part into a 2-dimensional code and forming a 2-dimensional matrix data having 1 bit per cell;
    a parameter-setting step of setting a fixed size of said converted 2-dimensional code according to said part regardless of an amount of information to be written in said 2-dimensional code;

a data converting step of combining said 2-dimensional matrix data formed in said 2-dimensional-code-conversion step with said fixed size of said 2-dimensional code set in said 2-dimensional-code-conversion step and converting said combined information into data for laser marking said 2-dimensional code including beam spot coordinates; and a laser-marking step of laser marking said 2-dimensional code having said fixed size set in said parameter-setting step directly on said part by a laser marker by laser dot marking to uniformly arrange dots vertically and horizontally in an n×m (where n and m are natural numbers) matrix array inside a unit cell of said 2-dimensional code based on said beam spot coordinates converted in said data converting step, wherein said dots we beam spots generated by irradiating a laser beam.

5. The 2-dimensional code formation method of claim 4 wherein said laser-marking step includes a process of reading said 2-dimensional code that was laser marked and checking whether or not marking of said 2-dimensional code is correct.

6. A 2-dimensional code formation device comprising:

information-acquisition means for acquiring the code size of a 2-dimensional code, storage information that is to be written in said 2-dimensional code, and the step size or number of dots n×m (where n and m are natural numbers) that are arranged vertically and horizontally inside a unit cell of said 2-dimensional code;

calculation means for performing a process of calculating the cell size of said unit cell, based on said code size and said storage information acquired by said information-acquisition means, to provide storage of said storage information in said 2-dimensional code having said acquired code size and a process of creating laser-marking information for forming said 2-dimensional code having said acquired code size, based on said code size, said storage information, said cell size and said step size or number of dots, wherein said laser-marking information includes at least dot coordinate information;

laser-marking means for performing laser marking of said 2-dimensional code having said acquired code size by laser dot marking to uniformly arrange dots vertically and horizontally in an n×m matrix array inside said unit cell based on said dot coordinate information of said laser-marking information by irradiating a laser beam directly on a material to be marked, wherein said dots are beam spots generated by irradiating a laser beam; and wherein said acquired code size is fixed regardless of an amount of storage information to be written in said 2-dimensional code.

7. The 2-dimensional code formation device of claim 6 wherein said calculation means calculates the cell size of said unit cell by dividing said code size acquired by said information-acquisition means by the number of code obtained by encoding said storage information into said 2-dimensional code based on change information for said storage information that was acquired by said information-acquisition means.

8. The 2-dimensional code formation device of claim 6 wherein said calculation means performs a process of creating different laser-marking information having different density based on change information for said step size or number of dots that was acquired by said information-acquisition means.

9. A 2-dimensional code formation device comprising:

information-acquisition means for acquiring the code size of a 2-dimensional code, storage information that is to be written in said 2-dimensional code, the number of unit cells of said 2-dimensional code, and the dot step size or number of dots n×m (where n and m are natural numbers) arranged vertically and horizontally inside a unit cell of said 2-dimensional code;

calculation means for performing a process of calculating the cell size based on said code size and said number of cells acquired by said information-acquisition means, and a process of creating laser-marking information for forming said 2-dimensional code having said acquired code size, based on said code size, said storage information, said cell size, and said dot step size or number of dots, wherein said laser-marking information includes at least dot coordinate information;

laser-marking means for performing laser marking of said 2-dimensional code having said acquired code size by laser dot marking to uniformly arrange dots vertically and horizontally in an n×m matrix array inside said unit cell based on said dot coordinate information of said laser-marking information by irradiating a laser beam directly on a material to be marked, wherein said dots are beam spots generated by irradiating a laser beam; and wherein said acquired code size is fixed regardless of an amount of storage information to be written in said 2-dimensional code.

10. The 2-dimensional code formation device of claim 9 wherein said calculation means calculates said cell size of unit cells by dividing said code size acquired by said information-acquisition means by said number of cells that was acquired by said information-acquisition means.

11. The 2-dimensional code formation device of claim 9 wherein said calculation means performs a process of creating different laser-marking information having different density based on change information for said step size or number of dots that was acquired by said information-acquisition means.

12. A 2-dimensional code formation device that forms a 2-dimensional code on a product that is made from a single part or a plurality of parts, and comprising:

means for acquiring manufacturing-history information for said part/parts of a product;

means for storing the acquired manufacturing-history information;

means for converting data, which includes an ID number identifying said manufacturing-history information, or includes said manufacturing-history information itself, to said 2-dimensional code and forming a 2-dimensional matrix data having 1 bit per cell;

means for setting a fixed size of said 2-dimensional code according to said part/parts regardless of an amount of information to be written into said 2-dimensional code;

means for combining said 2-dimensional matrix data with said fixed size of said 2-dimensional code and converting said combined information data into data for laser marking said 2-dimensional code including beam spot coordinates; and means for performing laser marking of said 2-dimensional code directly on said part/parts by laser dot marking to uniformly arrange dots vertically and horizontally in an n×m (where n and m are natural numbers) matrix array inside a unit cell of said 2-dimensional code based on said beam spot coordinates, wherein said dots are beam spots generated by irradiating a laser beam.

* * * * *

UNITED STATES PATENT AND TRADEMARK OFFICE
CERTIFICATE OF CORRECTION

| | | |
|---|---|---|
| PATENT NO. | : 7,594,613 B2 | |
| APPLICATION NO. | : 10/565775 | |
| DATED | : September 29, 2009 | |
| INVENTOR(S) | : Kazuo Sato et al. | |

It is certified that error appears in the above-identified patent and that said Letters Patent is hereby corrected as shown below:

Column 19, Line 15 (claim 4, line 15) delete "we"; add "are".

Signed and Sealed this

Eighth Day of December, 2009

David J. Kappos
*Director of the United States Patent and Trademark Office*